US010725719B2

(12) United States Patent
Kanamoto et al.

(10) Patent No.: US 10,725,719 B2
(45) Date of Patent: Jul. 28, 2020

(54) SYSTEM, IMAGE FORMING APPARATUS, METHOD FOR CONTROLLING THE SAME, AND STORAGE MEDIUM

(71) Applicant: CANON KABUSHIKI KAISHA, Tokyo (JP)

(72) Inventors: Yoshiji Kanamoto, Tokyo (JP); Toshihiko Iida, Toride (JP); Hiroya Igarashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/523,253

(22) Filed: Jul. 26, 2019

(65) Prior Publication Data

US 2020/0042260 A1    Feb. 6, 2020

(30) Foreign Application Priority Data

Aug. 1, 2018    (JP) .................................. 2018-145410

(51) Int. Cl.
*G06F 3/12*    (2006.01)
(52) U.S. Cl.
CPC .............. *G06F 3/127* (2013.01); *G06F 3/126* (2013.01); *G06F 3/1208* (2013.01); *G06F 3/1253* (2013.01); *G06F 3/1286* (2013.01)
(58) Field of Classification Search
CPC ...... G06F 3/127; G06F 3/1208; G06F 3/1253; G06F 3/126; G06F 3/1286
See application file for complete search history.

(56) References Cited

U.S. PATENT DOCUMENTS

| 9,058,555 | B2 | 6/2015 | Kanamoto et al. | |
|---|---|---|---|---|
| 9,542,129 | B2 | 1/2017 | Kanamoto et al. | |
| 10,061,544 | B2 | 8/2018 | Kanamoto | |
| 2006/0279780 | A1* | 12/2006 | Anno | G06F 3/1285 358/1.15 |
| 2007/0086038 | A1* | 4/2007 | Matsuzaki | G06F 3/1285 358/1.13 |

(Continued)

FOREIGN PATENT DOCUMENTS

JP    2014-219920 A    11/2019

OTHER PUBLICATIONS

Toshihiko Iida et al., U.S. Appl. No. 16/519,670, filed Jul. 23, 2019.

(Continued)

*Primary Examiner* — Moustapha Diaby
(74) *Attorney, Agent, or Firm* — Venable LLP

(57) ABSTRACT

An image forming apparatus performs, in a case where a file transmitted from an information processing apparatus is stored in a folder that is accessible from the information processing apparatus and with which a print setting is associated, processing for printing the file in accordance with the print setting. The image forming apparatus transmits, to the information processing apparatus as screen information of an operation screen displayable by a web browser, screen information of a first operation screen for accepting an operation for storing a print target file in the folder, and screen information of a second operation screen for, in a case where the operation is accepted via the first operation screen, accepting a determination as to whether or not to transmit the print target file to the image forming apparatus.

11 Claims, 29 Drawing Sheets

(56) References Cited

U.S. PATENT DOCUMENTS

2014/0029048 A1* 1/2014 Arakawa ............ G06K 15/1888
358/1.15
2016/0266851 A1* 9/2016 Kanamoto ............ G06F 3/1228

OTHER PUBLICATIONS

Toshihiko Iida et al., U.S. Appl. No. 16/521,992, filed Jul. 25, 2019.

* cited by examiner

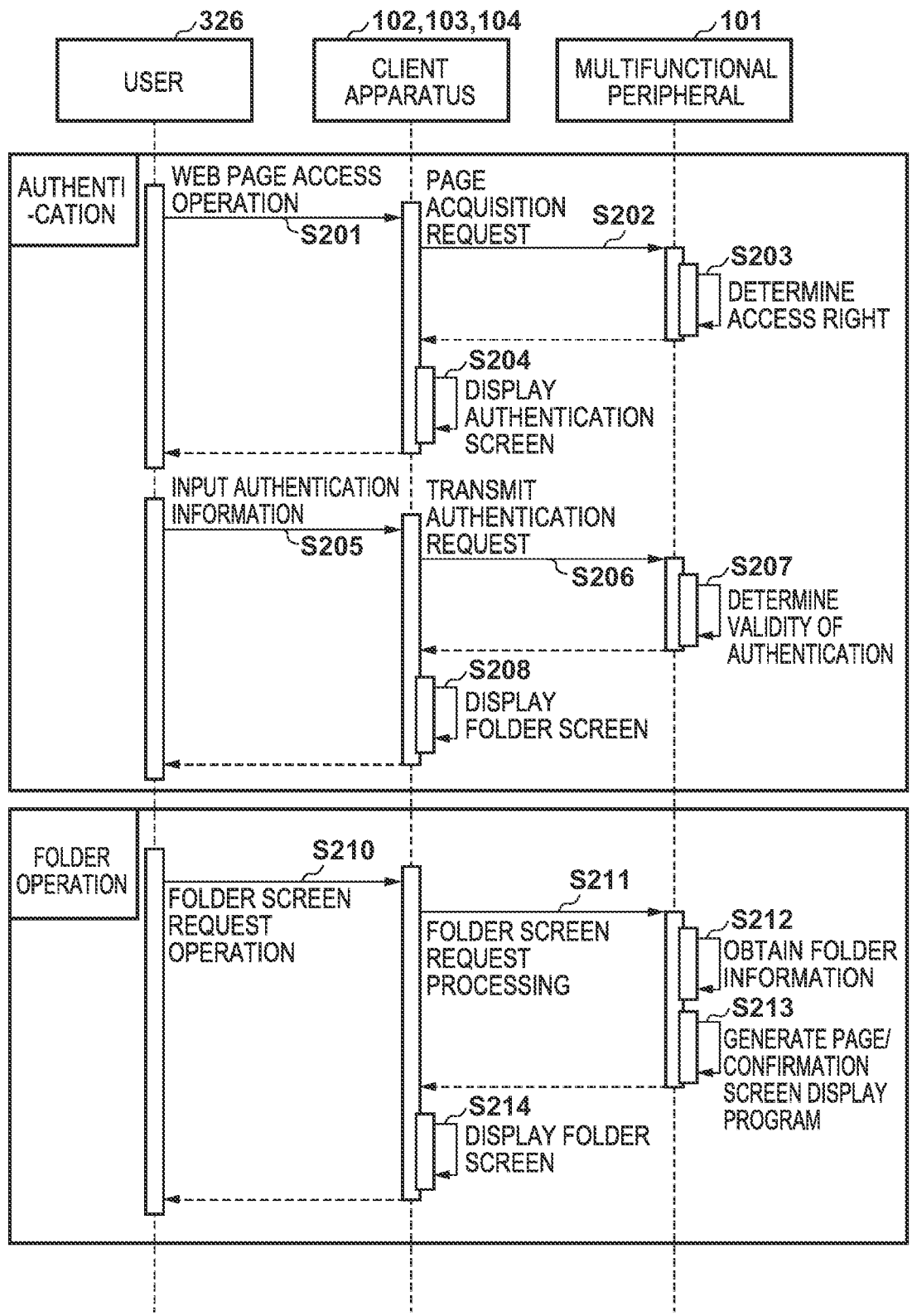

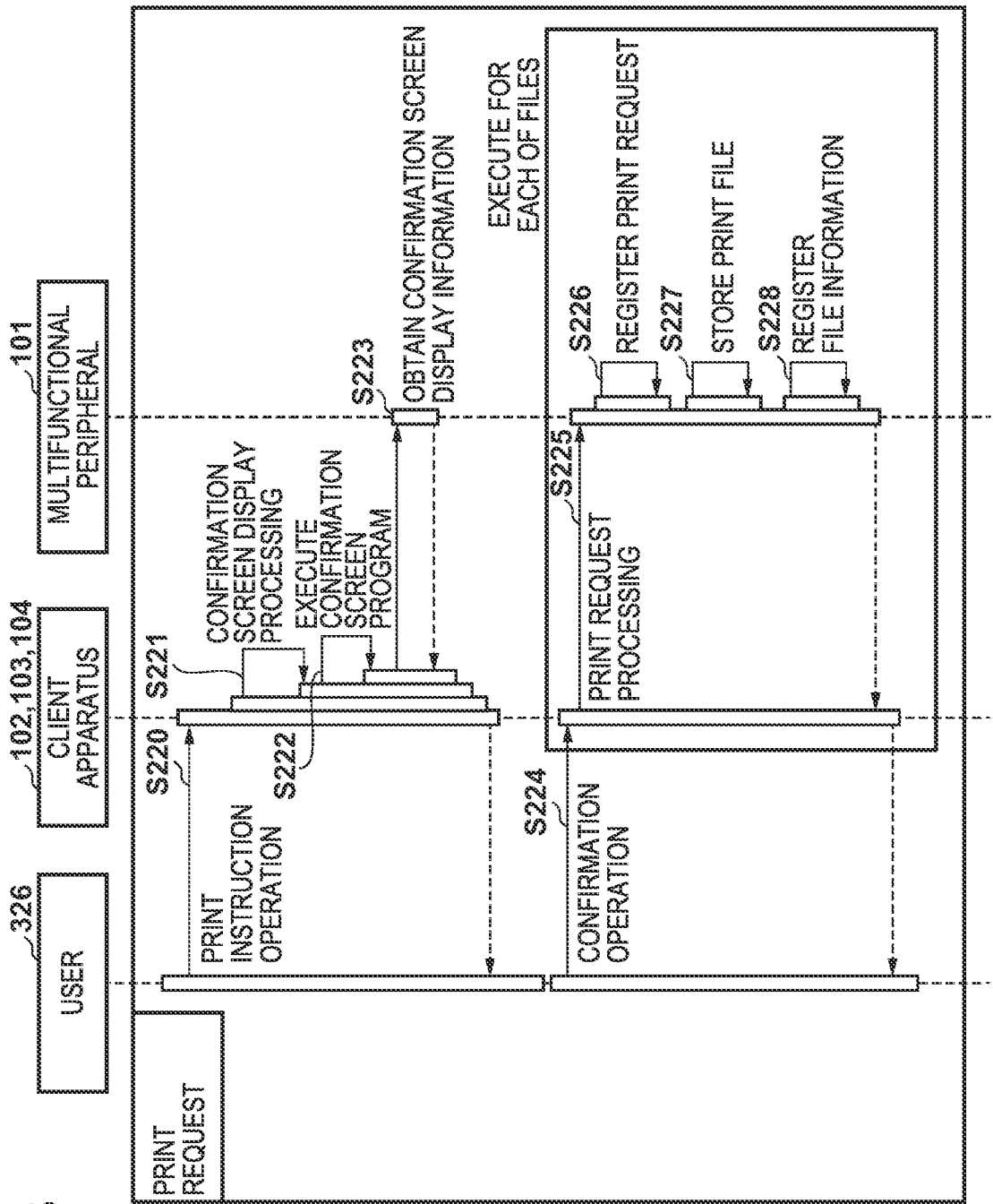

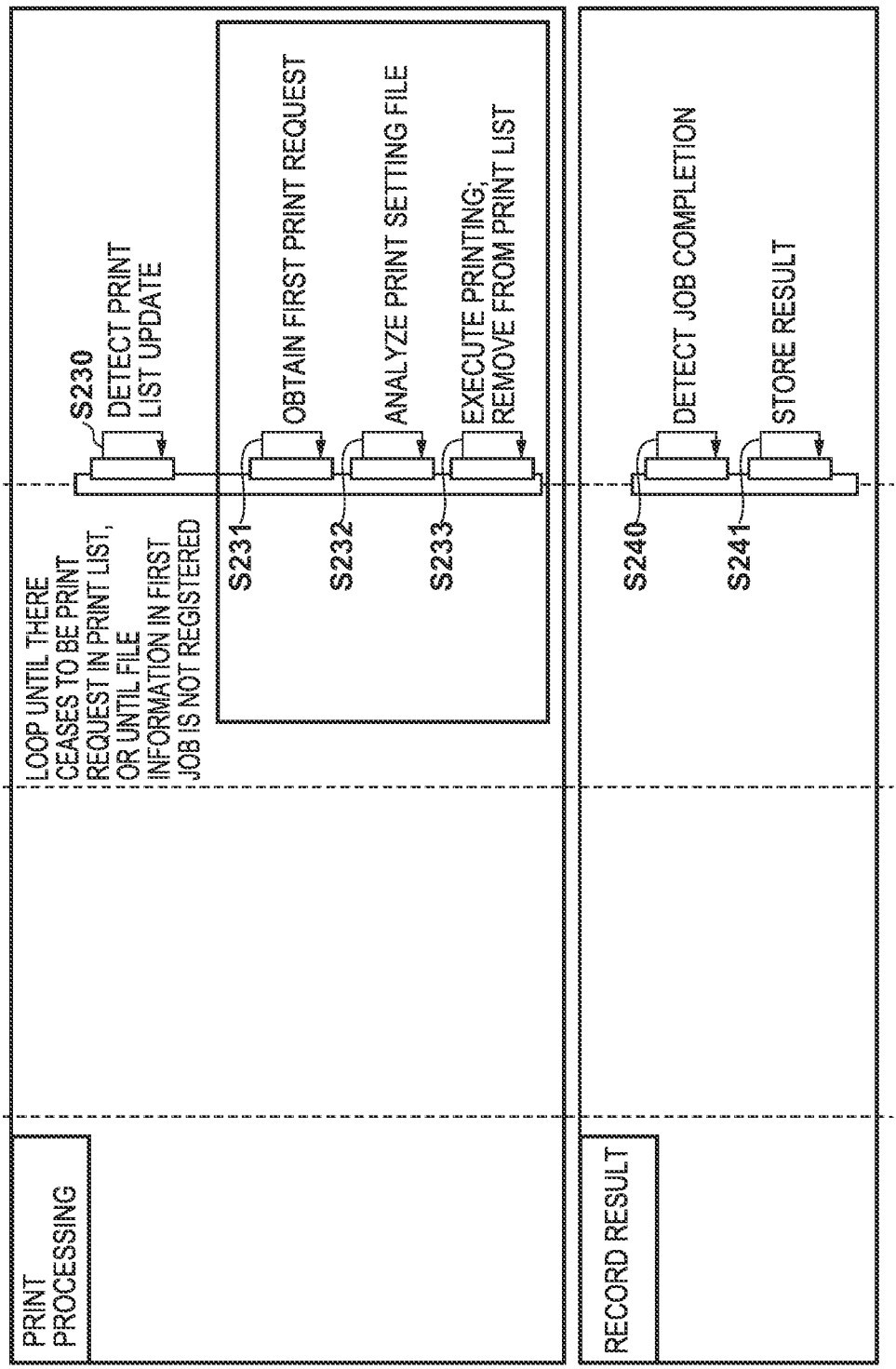

FIG. 4B

| | |
|---|---|
| BOOT LOADER | ~601 |
| OPERATING SYSTEM | ~602 |
| NETWORK CONTROL PROGRAM | ~603 |
| FILE SYSTEM SERVER | ~604 |
| WEB SERVER | ~605 |
| HOT FOLDER FUNCTION PROGRAM | ~606 |
| JDF FUNCTION PROGRAM | ~607 |
| PDL PRINT FUNCTION PROGRAM | ~608 |
| MEDIA MANAGEMENT PROGRAM | ~609 |
| USER AUTHENTICATION PROGRAM | ~610 |
| PRINT JOB QUEUE MANAGEMENT PROGRAM | ~611 |
| OTHER PROGRAMS | ~612 |

FIG. 6A

```
http://192.168.0.2/internalHotfolder.html    User Authentication

Internal Hot Folder Login

User Name:        [                ]~801
    Password:         [                ]~802
    Login Destination: [This Device ∨]~803

Enter a user name, password, and specify a Login Destination and click [Log In].
                      [  Log In  ]~804
```

FIG. 6B

```
http://192.168.0.2/internalHotfolder.html    User Authentication

Internal Hot Folder Login

User Name:        [UserAAA         ]~801
    Password:         [●●●●●●●●        ]~802
    Login Destination: [This Device ∨]~803

Enter a user name, password, and specify a Login Destination and click [Log In].
                      [  Log In  ]~804
```

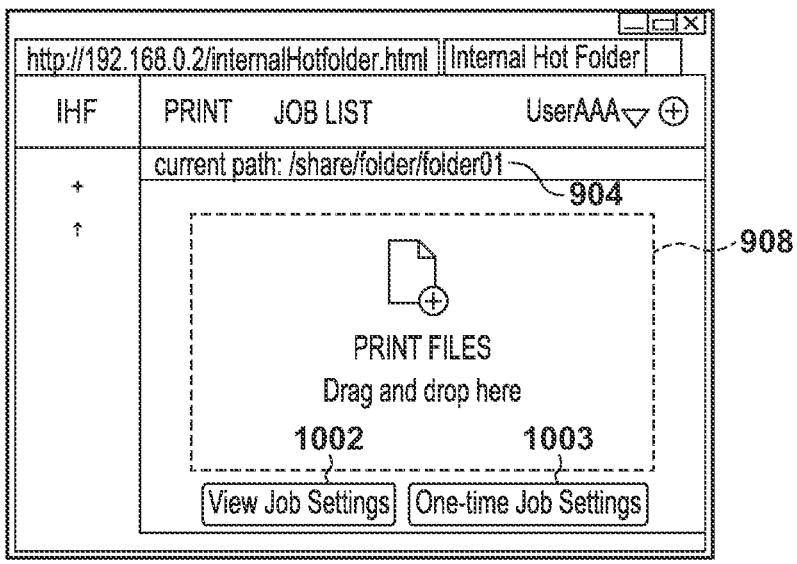

FIG. 8D

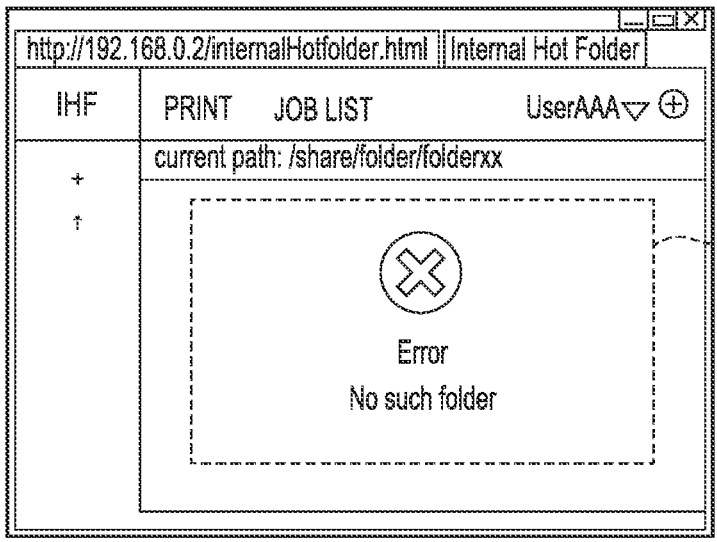

```
<?xml version='1.0'?>    —1006
<JobSettings>    —1007
    <MetaData>
        <FolderPath>/share/folder/folder01</FolderPath>    —1004
    </MetaData>
    <PrintSettings>    —1008
        <Copies>1</Copies>
        <Media>
            <MediaSize>A4</MediaSize>
            <MediaType>Auto</MediaType>
            <Location>Auto</Location>
        </Media>
        <Collate>SheetSetAndJob</Collate>
        <Disjointing>
            <OffsetDirection>None</OffsetDirection>
        </Disjointing>
    </PrintSettings>
    <LayoutSettings>    —1009
        <Sides>OneSidedFront</Sides>
    </LayoutSettings>
</JobSettings>
```
—1005

FIG. 9B

```
<?xml version="1.0" encoding="UTF-8" standalone="no"?>
<JDF xmlns="http://www.CIP4.org/JDFSchema_1_1"
       xmlns:cj="http://www.ganon.com/ns/GanonJDF" Activation="Active"
       Category="DigitalPrinting" ICSVersions="IDP_L1-1.0 Base_L1-1.0"
       ID="ID01" JobID="JobID01" JobPartID="JobPartID01" MaxVersion="1.2"
       Status="Ready" Type="Combined"
       Types="LayoutPreparation Imposition Interpreting Rendering DigitalPrinting"
       Version="1.2" cj:OwnerName="1">
 <ResourcePool>
  <RunList Class="Parameter" ID="IDRL" PartIDKeys="Run" Status="Available">
   <RunList Run="0">
    <LayoutElement>
     <FileSpec MimeType="application/pdf" URL="cid:Content00@hostname.com"/>
    </LayoutElement>
   </RunList>
  </RunList>
  <LayoutPreparationParams Class="Parameter" ID="IDLPP" Sides="OneSidedFront" Status="Available"/>
  <ColorantControl Class="Parameter" ID="IDCC" Status="Available"/>
  <InterpretingParams Class="Parameter" ID="IDIP" Status="Available"/>
  <RenderingParams Class="Parameter" ID="IDRP" Status="Available"/>
  <DigitalPrintingParams Class="Parameter" Collate="SheetSetAndJob" ID="IDDPP" Status="Available">
   <MediaRef rRef="MED_000"/>
   <Disjointing OffsetDirection="None"/>
  </DigitalPrintingParams>
  <Component Class="Quantity" ComponentType="FinalProduct" ID="IDC_DPP" Status="Unavailable"/>
  <Media Class="Consumable" Dimension="842 595" ID="MED_000" Status="Available">
   <Location LocationName="AutoSelect"/>
  </Media> </ResourcePool>
 <ResourceLinkPool>
  <LayoutPreparationParamsLink CombinedProcessIndex="0" Usage="Input" rRef="IDLPP"/>
  <RunListLink CombinedProcessIndex="0 1" Usage="Input" rRef="IDRL"/>
  <ColorantControlLink CombinedProcessIndex="2 4" Usage="Input" rRef="IDCC"/>
  <InterpretingParamsLink CombinedProcessIndex="2" Usage="Input" rRef="IDIP"/>
  <RenderingParamsLink CombinedProcessIndex="3" Usage="Input" rRef="IDRP"/>
  <DigitalPrintingParamsLink CombinedProcessIndex="4" Usage="Input" rRef="IDDPP"/>
  <ComponentLink Amount="1" CombinedProcessIndex="4" Usage="Output" rRef="IDC_DPP"/>
  <MediaLink CombinedProcessIndex="4" Usage="Input" rRef="MED_000"/>
 </ResourceLinkPool>
</JDF>
```

FIG. 11A

```
function getFileList(files) {
  var joblist= "";

for (var i = 0; i < files.length; i++) {
    joblist+= |;
    joblist+= files[i].name;
    joblist+= files[i].size;
    joblist+= files[i].lastModifiedDate;
  }
  returnjoblist;
}
```
~1300

```
function getJobSettingsView(event) { var jobsettings="";

var aURL="/JDFParse?folderpath=" +folderpath;
  $.ajax({
    url : aURL,
    type :"GET ",
    dataType: "xml",
    cache : false,
  }).done(function(responseData) {
    $("ParseResult", xml).each(function(k,parseResult) {
      $(parseResult).children("Attribute").each(function(i, attribute) {
        jobsettings+= $(xml).children("AttributeName").text();
        jobsettings+=$(xml).children("AttributeValue").text();
      }) });

return jobsettings;
}
```

```
function getJobList(){ var joblist="";

var aURL= "/JobList";
    $.ajax({
      url : aURL,
      type : "GET",
      dataType : "xml",
      cache : false,
    }).done(function(responseData) {
      $("JobInfo", xml).each(function(responseData){
        joblist+=$('date', this).text();
        joblist+=$('number', this).text();
        joblist+=$('name', this).text();
        joblist+=$('user', this).text();
        joblist+=$('status', this).text();
    });
    return joblist;
  }
```

~1320

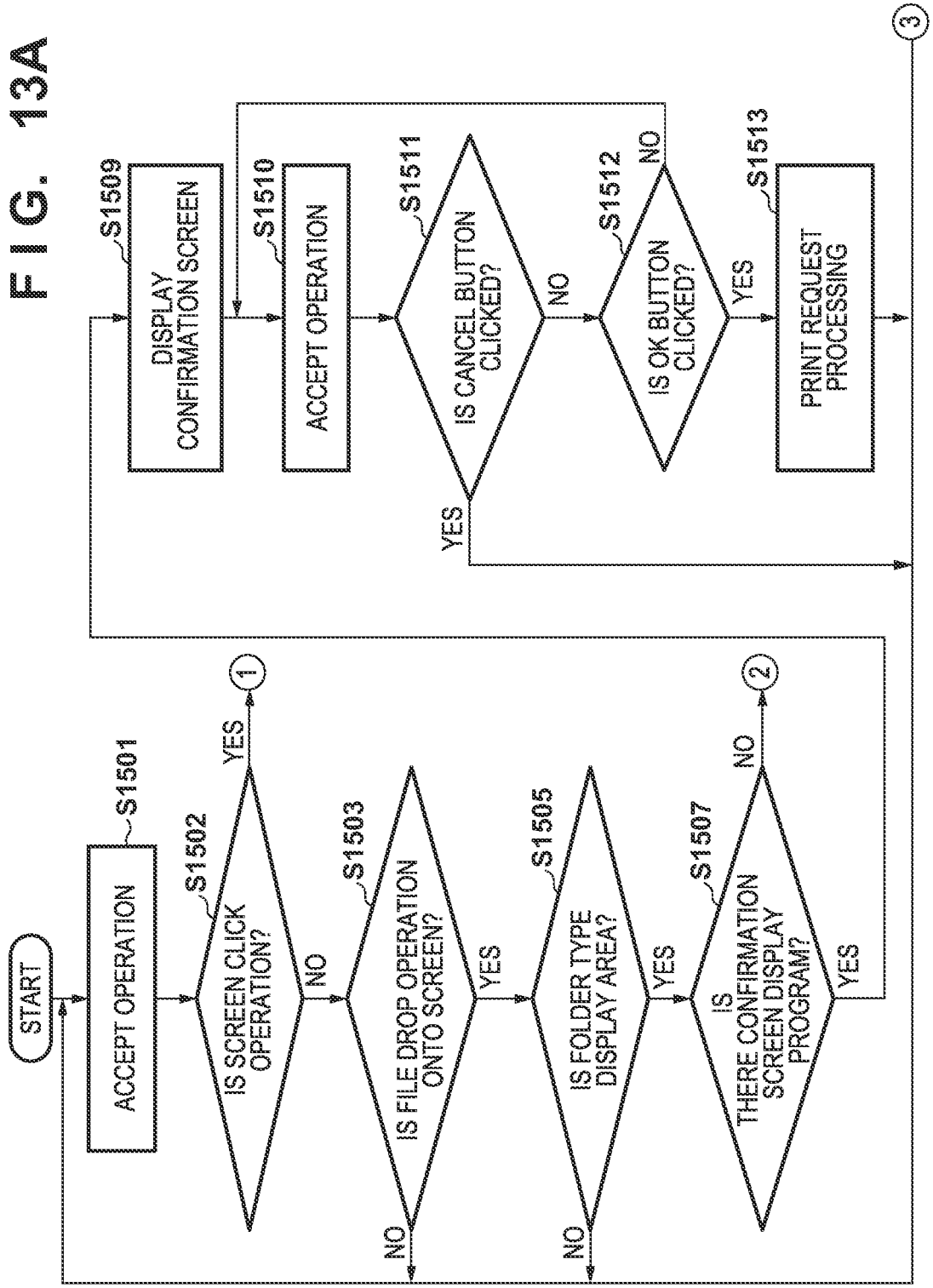

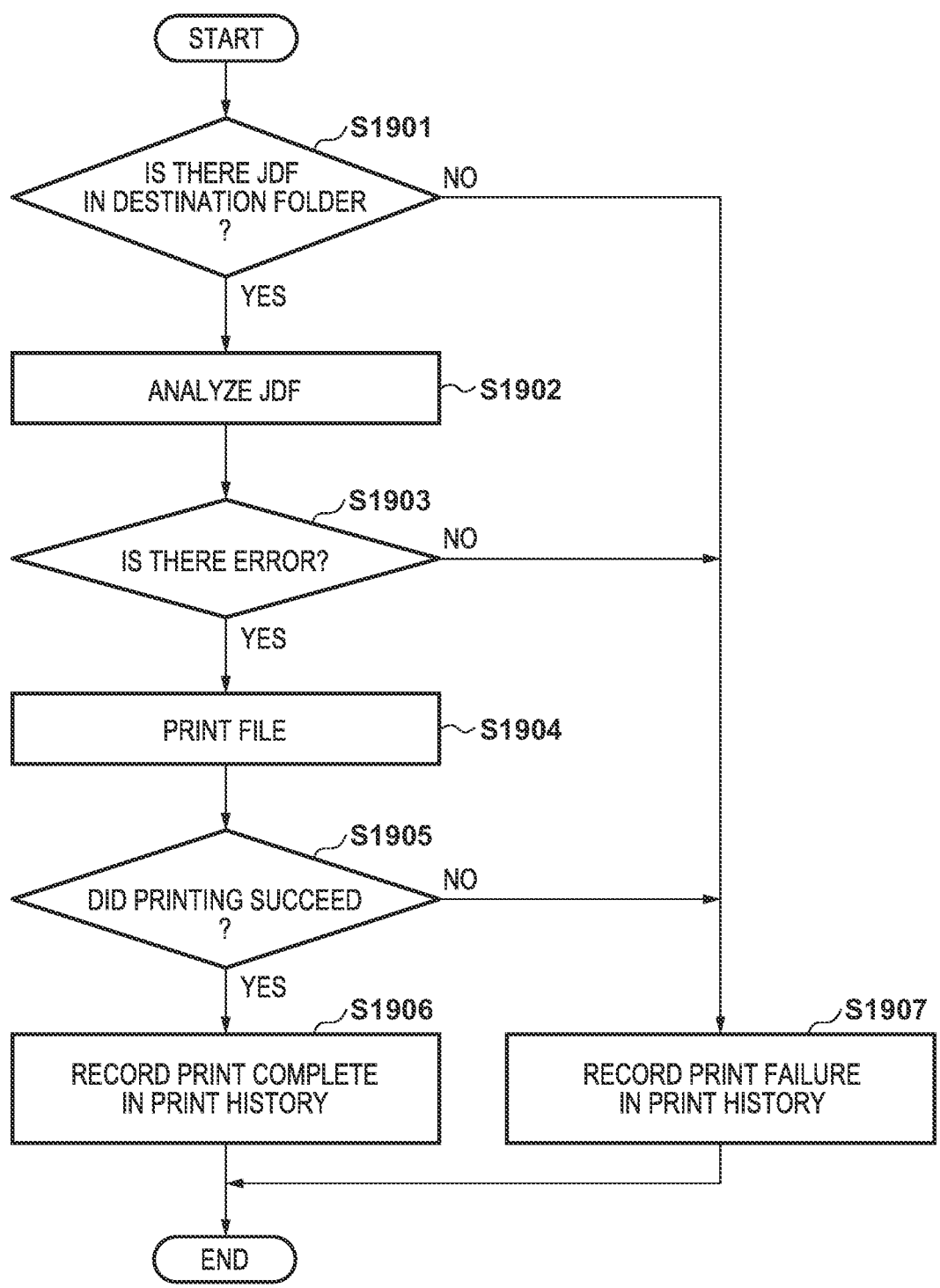

FIG. 18A

| ID | DESTINATION FOLDER PATH | USER NAME | FILE NAME | FILE PATH |
|---|---|---|---|---|
| 101 | /share/folder/folder01 | Sato | marketing_materials.pdf | /share/folder/folder01/marketing_materials.pdf |
| 102 | /share/folder/folder02 | Koide | document.pdf | |

FIG. 18B

| ID | DESTINATION FOLDER PATH | USER NAME | FILE NAME | FILE PATH |
|---|---|---|---|---|
| 102 | /share/folder/folder02 | Koide | document.pdf | |

FIG. 18C

| ID | DESTINATION FOLDER PATH | USER NAME | FILE NAME | FILE PATH |
|---|---|---|---|---|
| 102 | /share/folder/folder02 | Koide | document.pdf | |
| 103 | /share/folder/folder01 | Ueda | handout.pdf | |

FIG. 18D

| ID | DESTINATION FOLDER PATH | USER NAME | FILE NAME | FILE PATH |
|---|---|---|---|---|
| 102 | /share/folder/folder02 | Koide | document.pdf | |
| 103 | /share/folder/folder01 | Ueda | handout.pdf | /share/folder/folder01/handout.pdf |

FIG. 18E

| ID | DESTINATION FOLDER PATH | USER NAME | FILE NAME | FILE PATH |
|---|---|---|---|---|
| 102 | /share/folder/folder02 | Koide | document.pdf | /share/folder/folder02/document.pdf |
| 103 | /share/folder/folder01 | Ueda | handout.pdf | /share/folder/folder01/handout.pdf |

SYSTEM, IMAGE FORMING APPARATUS, METHOD FOR CONTROLLING THE SAME, AND STORAGE MEDIUM

BACKGROUND OF THE INVENTION

Field of the Invention

The present invention relates to a system, an image forming apparatus, a method for controlling the same, and a storage medium.

Description of the Related Art

A mechanism is known in which a hot folder is prepared in a client apparatus such as a PC, and a print job is automatically transmitted from the client apparatus to an image forming apparatus such as a printer in accordance with storage of a print target file in the hot folder, thereby executing a print process (Japanese Patent Laid-Open No. 2014-219920). According to this mechanism, the user of the client apparatus can issue a print instruction by a relatively simple operation of storing a print target file in a hot folder. For example, in a case of performing an instruction to print a large number of print target files (print data) by the same print setting, such a print instruction can be issued by collectively storing these files in a hot folder. Therefore, the user can be relieved of the complexity of opening individual files and making print instructions, using an application such as a printer driver.

In recent years, a mechanism has been known in which the above-mentioned hot folder is incorporated in a printing apparatus, and a hot folder function is provided as a function of the printing apparatus (in-device hot folder function). The in-device hot folder function is a function in which a file system and a file server included in the printing apparatus expose a shared folder to an external client apparatus, and the printing apparatus executes printing in response to storing of a print target file in the shared folder.

The in-device hot folder function can provide additional convenience to the user while providing the same operability and convenience as the hot folder operating on the client apparatus. First, there is no need to install an application for implementing the hot folder function on the client apparatus. Second, if the client apparatus has a function of accessing the file system of the printing apparatus, a printing environment that is independent of the operating system can be realized. Third, since print settings corresponding to the hot folder are held by the printing apparatus, there is no need to individually hold or manage the print settings in individual client apparatuses.

However, the above-mentioned prior art has the following problems. For example, according to the mechanism of the in-device hot folder function described above, the user can issue a print instruction by a simple operation of storing a print target file in a hot folder, similarly to a normal file operation. However, since the printing is automatically started in response to the storage of the file in the hot folder, there is a possibility that printing not intended by the user is executed due to an operation error of the user. Especially, if an instruction to print a file containing personal information or highly confidential information is erroneously issued, information leakage may occur.

SUMMARY OF THE INVENTION

The present invention provides a technique for prompting a user to confirm execution of printing when a print instruction is accepted by an operation of storing a file in a folder associated with print settings via an operation screen provided from the image forming apparatus to an external apparatus.

According to one aspect of the present invention, there is provided an image forming apparatus capable of communicating with an information processing apparatus, the image forming apparatus comprising: a processing unit configured to, in a case where a file transmitted from the information processing apparatus is stored in a folder that is accessible from the information processing apparatus and with which a print setting is associated, perform processing for printing the file in accordance with the print setting; and a transmission unit configured to transmit, to the information processing apparatus, screen information of an operation screen displayable by a web browser, the transmission unit transmitting screen information of a first operation screen for accepting an operation for storing a print target file in the folder from a user, and screen information of a second operation screen for, in a case where the operation is accepted from the user via the first operation screen, accepting a determination as to whether or not to transmit the print target file to the image forming apparatus from the user.

According to another aspect of the present invention, there is provided a method for controlling an image forming apparatus capable of communicating with an information processing apparatus, the method comprising: in a case where a file transmitted from the information processing apparatus is stored in a folder that is accessible from the information processing apparatus and with which a print setting is associated, performing processing for printing the file in accordance with the print setting; and transmitting, to the information processing apparatus, screen information of an operation screen displayable by a web browser, wherein screen information of a first operation screen for accepting an operation for storing a print target file in the folder from a user, and screen information of a second operation screen for, in a case where the operation is accepted from the user via the first operation screen, accepting a determination as to whether or not to transmit the print target file to the image forming apparatus from the user, are transmitted.

According to still another aspect of the present invention, there is provided a non-transitory computer-readable storage medium storing a computer program for causing a computer to execute a method for controlling an image forming apparatus capable of communicating with an information processing apparatus, the method comprising: in a case where a file transmitted from the information processing apparatus is stored in a folder that is accessible from the information processing apparatus and with which a print setting is associated, performing processing for printing the file in accordance with the print setting; and transmitting, to the information processing apparatus, screen information of an operation screen displayable by a web browser, wherein screen information of a first operation screen for accepting an operation for storing a print target file in the folder from a user, and screen information of a second operation screen for, in a case where the operation is accepted from the user via the first operation screen, accepting a determination as to whether or not to transmit the print target file to the image forming apparatus from the user, are transmitted.

According to yet another aspect of the present invention, there is provided a system including an image forming apparatus and an information processing apparatus capable of communicating with the image forming apparatus, wherein the image forming apparatus comprises: a processing unit configured to, in a case where a file transmitted from the information processing apparatus is stored in a folder that is accessible from the information processing apparatus and with which a print setting is associated, perform processing for printing the file in accordance with the print setting; and a first transmission unit configured to transmit, to the information processing apparatus, screen information of an operation screen displayable by a web browser, the first transmission unit being configured to transmit screen information of a first operation screen for accepting an operation for storing a print target file in the folder from a user, and screen information of a second operation screen for accepting a determination as to whether or not to transmit the print target file to the image forming apparatus from a user, and the information processing apparatus comprises: a display control unit configured to display, on a display unit, an operation screen as a web browser screen based on screen information received from the image forming apparatus, the display control unit displaying the second operation screen when an operation for storing a print target file in the folder is accepted from a user during display of the first operation screen; and a second transmission unit configured to, in a case where a determination to not transmit the print target file is accepted via the second operation screen, not transmit the print target file to the image forming apparatus, and in a case where a determination to transmit the print target file is accepted, transmit the print target file to the image forming apparatus.

Further features of the present invention will become apparent from the following description of exemplary embodiments (with reference to the attached drawings).

BRIEF DESCRIPTION OF THE DRAWINGS

FIGS. 2A-2C are sequence diagrams of the entire system.
FIGS. 4A and 4B are block diagrams illustrating a configuration of a multifunctional peripheral 101.
FIGS. 6A and 6B are views showing examples of a web page having a login function that is to be displayed on a web browser 705.
FIGS. 8A-8F are views showing examples of web pages having a print setting creation function that are to be displayed on the web browser 705.
FIGS. 9A-9C are schematic diagrams of a folder configuration created in a HDD 404 of the multifunctional peripheral 101.
FIGS. 11A-11C are views showing examples of a confirmation screen display program executed when a print instruction operation with respect to a plurality of files is accepted.
FIGS. 12A-12H are diagrams of the transition of web pages displayed on the web browser 705 when a print instruction is made.
FIGS. 13A and 13B are flow charts showing a sequence of processing by a CPU 501 when an operation is accepted by a web browser.

FIG. 17 is a flow chart showing a sequence of processing by the CPU 401 in print processing.
FIGS. 18A-18E are schematic diagrams showing changes in a print list stored in a RAM 402.

DESCRIPTION OF THE EMBODIMENTS

Figure 1:
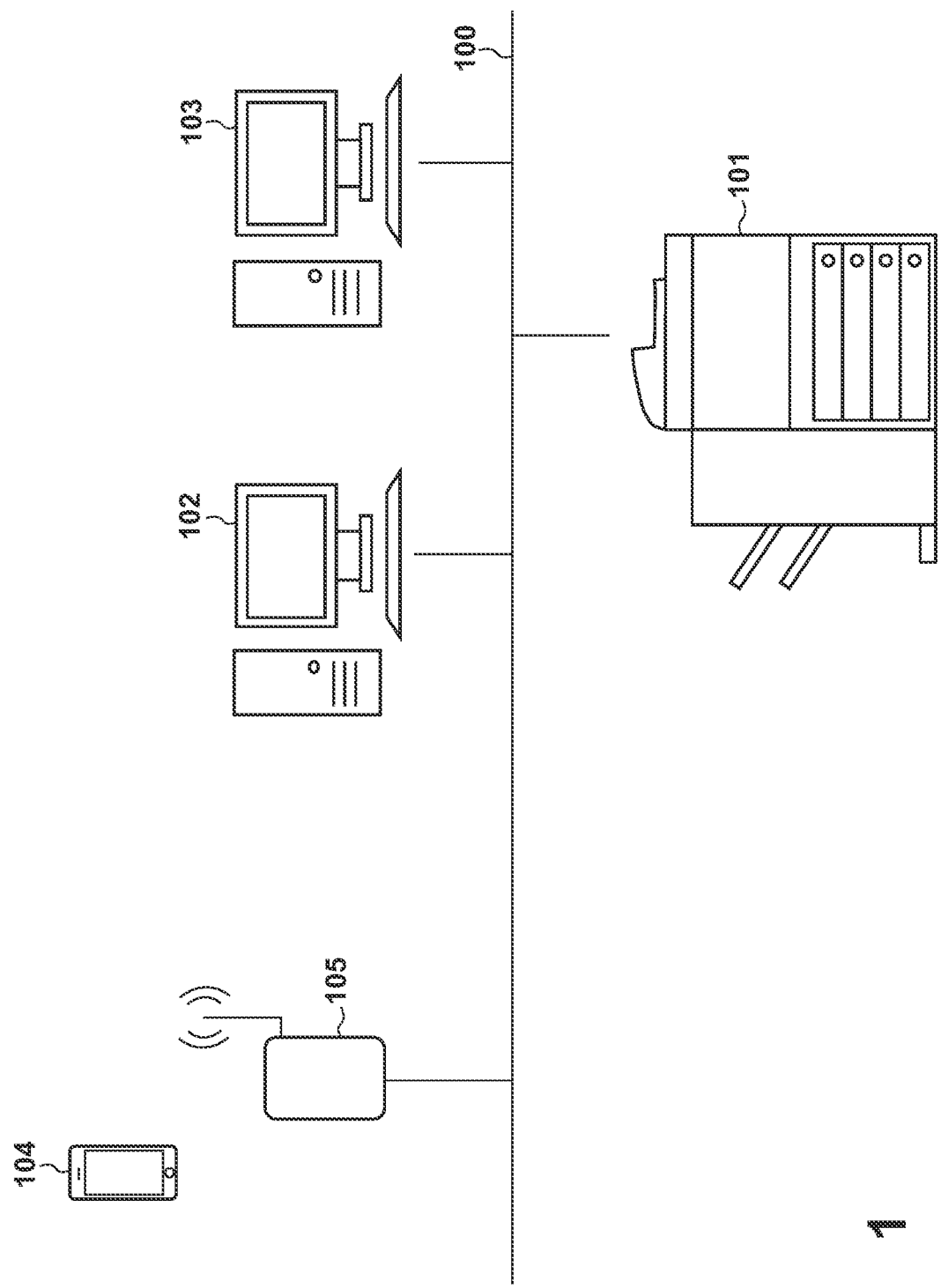
FIG. 1 is a block diagram of a printing system.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Note that description is given by taking a multifunctional peripheral (digital multifunctional peripheral/MFP) as an example of an image forming apparatus according to an embodiment. However, application is not limited to a multifunctional peripheral, and may be to any apparatus that has an image processing function.

<Configuration of Printing System>

Hereinafter, one embodiment of the present invention will be described with reference to the attached drawings. First, a configuration of a printing system according to the present embodiment will be described with reference to FIG. 1. In the present embodiment, description is given by example in which a multifunctional peripheral 101 (MFP) is taken as an example of an image forming apparatus, and a PC or a mobile terminal is taken as an example of a client apparatus which is an information processing apparatus. The multifunctional peripheral 101 and PCs 102 and 103 are communicably connected via a network 100. The PCs 102 and 103 may be systems that operate in accordance with different operating systems. Alternatively, they may be systems that have different versions of the same operating system. In the present embodiment, a printing system environment in which types of client apparatus application execution environments are mixed is assumed.

Further, a wireless LAN access point 105 is connected to the network 100. The wireless LAN access point 105 is configured to be able to communicate with a mobile terminal 104 and various other types of devices (not shown) via a wireless LAN. In this embodiment, devices of a type such as the mobile terminal 104, as a client apparatus equivalent to the PCs 102 and 103, may also be provided with the print environment described below. Such a mobile terminal 104 is rapidly becoming popular, and product diversification is significant. Further, with the popularization of such portable terminals, it is also assumed that, for example, the client apparatus of a user requesting printing from the multifunctional peripheral 101 disposed on the network 100 illustrated in the figure may be a device taken from a public environment.

Next, the PCs 102 and 103 and the mobile terminal 104, which are client apparatuses, will be described. Hereinafter, the PCs 102 and 103, and the mobile terminal 104 are generally referred to as a client apparatus.

The PCs 102 and 103 can execute various programs such as an application program for inputting print jobs. However, in the present embodiment, it is assumed that a printing application program is not installed. It is also assumed that the PCs 102 and 103 have a network file sharing function and a web-information-access function such as a web browser, which are ordinarily present on a modern operating system. By using the above-described web-information-access function, a client apparatus can use the functions of, via the web, mutually transmitting and receiving information and sharing information with a device connected to the network 100. Therefore, the client apparatus can transmit and receive various kinds of data including print target files to and from the multifunctional peripheral 101 by using the web-information-access function.

<Sequence Diagram of the Entire Printing System>

Next, referring to FIG. 2A-FIG. 2C, a description will be given regarding a sequence in which a user 326 authenticates, moves a folder, and instructs printing of a file, and the file is actually printed. Processing starts when the user 326 shown in FIG. 3 operates a UI unit 301 and requests access to a web server unit 328. Since there is no difference in configuration and control between client apparatuses, description is given taking one device as an example.

First, with reference to FIG. 2A, description is given of a processing procedure of steps S201 to S208. This processing is performed when the user 326 operates a browser app unit 302 via an operation unit 327 of the client apparatus and performs a web page access operation on a web server unit 328 of the multifunctional peripheral 101. A process of authenticating an operator (a user) is executed by an authentication unit 304 via the web server unit 328. Screens to be displayed on the UI unit 301 in the authentication process will be described later with reference to FIG. 8A-FIG. 8F.

In step S201, when the user 326 performs an operation on the UI unit 301 of the client apparatus, the browser app unit 302 of the client apparatus accepts the operation which is for displaying a web page. This is an operation for instructing acquisition of a web page provided by the in-device hot folder, and specifically, an operation such as inputting an address or selecting a link is performed. Next, in step S202, the browser app unit 302 performs a page acquisition request to the multifunctional peripheral 101 for an accepted URL. This processing is a normal web browser process, and is performed by a GET request or the like.

Next, in step S203, the web server unit 328 of the multifunctional peripheral 101 acquires information of the user 326 from the received page acquisition request and determines whether or not they have a right (access right) to access the designated URL. The user 326 can acquire an access right by performing login authentication. The web server unit 328 transmits information of an authentication screen for performing login authentication, if the user has an access right, to the client apparatus.

Next, in step S204, the browser app unit 302 displays the authentication screen on the UI unit 301 according to the screen information received from the web server unit 328. Next, in step S205, when the user 326 inputs authentication information to the authentication screen displayed on the UI unit 301, the browser app unit 302 accepts the input information. Thereafter, in step S206, the browser app unit 302 transmits an authentication request to a URL described in the web page of the authentication screen. The authentication request includes the authentication information inputted from the user 326. Normally, the authentication request is transmitted in an encrypted form.

In step S207, the web server unit 328 acquires the authentication information from the received authentication request, and queries the authentication unit 304 of the multifunctional peripheral 101 as to whether or not the authentication information is valid. The authentication unit 304 compares information of a user DB 305 with the accepted authentication information, and returns a result. If the result from the authentication unit 304 indicates successful authentication, the web server unit 328 notifies the browser app unit 302 of information of a folder screen together with the authentication result. In step S208, the browser app unit 302 displays, on the UI unit 301, the folder screen according to the screen information received from the web server unit 328. The folder screen displayed here is a screen of the folder of the highest hierarchy in the hot folder.

Next, a sequence of processing of folder operations shown in step S210 to step S214 will be described. Here, the processing is started from a point where the user 326 operates the folder screen displayed on the UI unit 301 to perform an operation for requesting a folder screen. Folder screens and operations on these screens will be described later using FIG. 7A-FIG. 7E.

In step S210, the browser app unit 302 of the client apparatus accepts the operation of requesting the folder screen performed by the user 326 operating the folder screen displayed on the UI unit 301. This operation is an operation of any destination folder designation button, an operation of an upper hierarchical movement button 910 shown in FIG. 7B, an operation of designating an address including a folder path directly to the browser app unit 302, or the like.

Next, in step S211, the browser app unit 302 transmits a request to the web server unit 328 to acquire information of the designated address. Details will be described later with reference to FIGS. 13A, 13B and 14. Next, in step S212, the web server unit 328 of the multifunctional peripheral 101 detects a request for a folder screen. Further, the web server unit 328 acquires a folder path from the received folder screen request, and acquires a file list of the folder via a file system unit 329. Then, the web server unit 328 determines whether or not a file having a predetermined print setting file extension is included in the acquired file list. Details will be described later with reference to FIG. 14.

Next, in step S213, the web server unit 328 generates a folder screen based on the acquired folder information by a page generation unit 306. Further, the web server unit 328 calls a hot folder function unit 321. The hot folder function unit 321 causes a program generation unit 331 to generate a confirmation screen display program. The generated information is notified to the browser app unit 302. Details will be described later with reference to FIG. 10, FIG. 11A-FIG. 11C, and FIG. 14.

In step S214, the browser app unit 302 displays, on the UI unit 301, the folder screen according to the information received from the web server unit 328. The folder screen will be described later with reference to FIG. 8A to FIG. 8F.

Next, with reference to FIG. 2B, description is given of a processing procedure for a print request indicated in step S220 to step S228. This processing is started by the user 326 operating a folder screen displayed on the UI unit 301 to perform a print instruction operation.

In step S220, the browser app unit 302 accepts a print instruction operation performed by the user 326 via the folder screen displayed on the UI unit 301. The operation is an operation of dragging and dropping files in a predetermined display area (for example, a folder type display area 908 shown in the FIG. 7A) on the folder screen.

In step S221, the browser app unit 302 performs processing for displaying a confirmation screen. This confirmation screen is a screen for allowing the user 326 to confirm whether or not the print instruction operation is intended by the user 326. Next, in step S222, the browser app unit 302 executes a confirmation screen display program. The confirmation screen display program is a program for acquiring information to be displayed on the confirmation screen in accordance with a setting of the user 326.

In step S223, the hot folder function unit 321 analyzes the request for the confirmation screen display information received by the web server unit 328, and determines the content of the display information to be acquired. The hot folder function unit 321 returns display information to the browser app unit 302 based on the determination result. The browser app unit 302 displays a confirmation screen on the UI unit 301 based on the information received from the hot folder function unit 321.

In step S224, the user 326 operates a confirmation window displayed on the UI unit 301 to perform a confirmation operation. The operation is an operation of selecting a predetermined button on the confirmation screen.

The processing of steps S225 to S228 is executed for each time a file was designated by a print instruction operation, and one file is transmitted to the web server unit 328 in the respective processing. The steps S226 to S228 processing will be described later in detail with reference to FIG. 15.

In step S225, the browser app unit 302 performs processing for a print request to the web server unit 328. This processing uses a normal web browser function, such as a POST request. The print request processing includes a file for which a print instruction was received, and the folder path of the folder screen. Subsequently, in step S226, the web server unit 328 of the multifunctional peripheral 101 detects the received print request, and calls the hot folder function unit 321 to register the print request in the print list stored in the RAM 402. An ID is added to the print request to be registered as information corresponding to the request, and the accepted folder path is included.

Next, in step S227, the web server unit 328 reads the file from the print request, and stores the read file in the HDD 404 via the file system unit 329. Subsequently, in step S228, the hot folder function unit 321 adds the file path of the saved file to the print request which was registered in the print list in step S226.

Next, with reference to FIG. 2C, description is given of a processing procedure for print processing indicated in steps S230 to S233. Here, the hot folder function unit 321 starts processing when it detects that the print list has been updated. Processing for steps S230 to S233 will be described later in detail with reference to FIG. 16 to FIG. 17.

In step S230, the hot folder function unit 321 detects that the print list stored in the RAM 402 of the multifunctional peripheral 101 has been updated. The processing of steps S231 to S233 is repeatedly executed until there is no print request in the print list, or a file path for a first print request is not registered.

In step S231, the hot folder function unit 321 acquires the first print request of the print list. When there is no print request in the print list, or when the file path of the print request is not registered, the processing ends. Next, in step S232, the hot folder function unit 321 acquires the folder path from the print request, and acquires the print setting file in the folder through the file system unit 329. Further, a job registration requesting unit 323 analyses the acquired print setting file.

Next, in step S233, the hot folder function unit 321 acquires the file path from the print request, and reads the file through the file system unit 329. The job registration requesting unit 323 transmits a job registration request to a job registering unit 320 using the result of the analysis in step S232 and the read file. At the same time, the print request is deleted from the print list stored in the RAM 402.

Next, a sequence of processing for recording the results shown in steps S240 and S241 will be described. Here, the processing is started from when a print queue management unit 319 detects the completion of printing. Processing for steps S240 and S241 will be described later in detail with reference to FIG. 15.

In step S240, the print queue management unit 319 detects print completion (job completion) from a printer unit 314 and notifies a print result management unit 332 of the print completion. Next, in step S241, the print result management unit 332 receives the print completion notification and registers a print result in a print history stored in the RAM 402.

<System Configuration>

Figure 3:
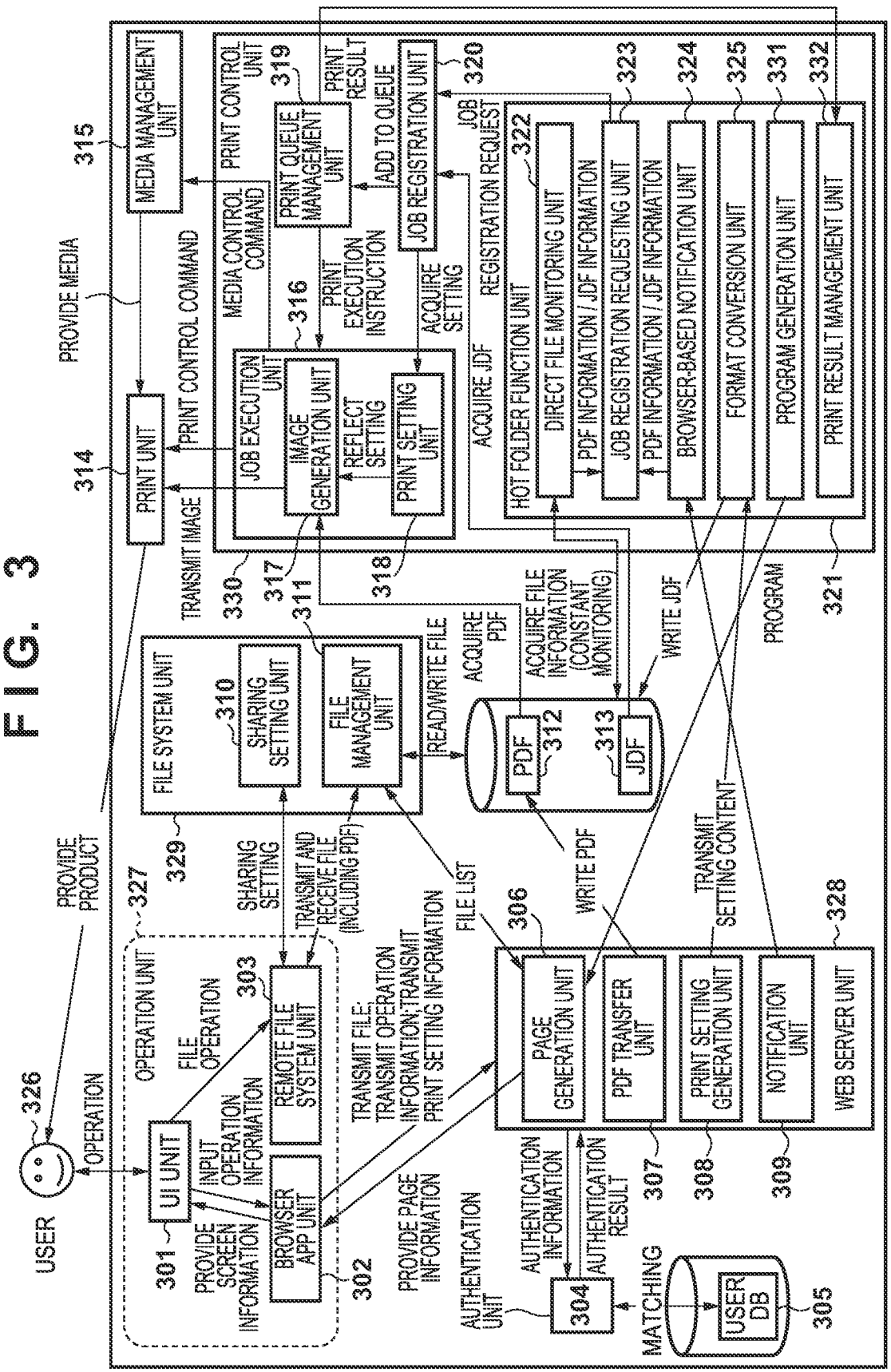
FIG. 3 is a system configuration diagram of an in-device hot folder.

Next, a functional configuration of the hot folder printing system according to the present embodiment will be described with reference to FIG. 3. As shown in FIG. 3, the printing system can be represented by a collection of a plurality of functional modules. Each module may be implemented by hardware or software. In addition, configuration may be taken such that some of the functional modules are arranged in an external server (not shown) and functionality is realized by communication with the external server. Note that the same reference numerals are used for portions common to those in FIG. 2A-FIG. 2C, and descriptions thereof are omitted. Furthermore, functional modules which configure respective systems, processes of the functional modules, and relationships between functions will be described here.

The printing system includes the above-described operation unit 327, the web server unit 328, the file system unit 329, a print control unit 330, the printer unit 314, the authentication unit 304, and the like. The operation unit 327 includes the UI unit 301, the browser app unit 302, and a remote file system unit 303. The UI unit 301 is a functional unit provided for instructing display of image information and input and output of data, and accepting operation instructions. Content of an operation by the user 326 is reflected to the browser app unit 302 and the remote file system unit 303.

The browser app unit 302 is a functional unit that presents screen information by displaying web content on a window screen on the UI unit 301. The browser app unit 302 performs processing for transmitting and receiving information to and from the web server unit 328, which will be described later. Screen information is mainly provided from the browser app unit 302 to the UI unit 301.

The remote file system unit 303 is a functional unit for operating folders and files in the multifunctional peripheral 101 by using file system functionality provided by the client apparatus. The remote file system unit 303 accesses a file management unit 311 to perform various operations under the access right and based on the setting information of a sharing setting unit 310. Sharing setting information is exchanged between the remote file system unit 303 and the sharing setting unit 310. More specifically, the following operations are possible by using remote file system functionality. For example, this corresponds to execution of processing derived from a file system, such as the acquisition of information on a folder hierarchy, information on a path, list information of subfolders and files under a folder, folder creation/deletion processing, and file creation/deletion processing. Also, an in-device hot folder function includes, for example, processing for transmitting a file in a PDF format, which is print target data. However, as will be described later, the in-device hot folder in the present embodiment is characterized in that a print-related instruction is executed via the web server unit 328 instead of the operation unit 327 directly executing a print-related instruction with respect to the file system unit 329.

The web server unit 328 is a functional unit that the multifunctional peripheral 101 has, and is for providing a web service to an external apparatus. The web server unit 328 executes a series of processes for receiving various demands, that is, requests from an external apparatus, and returning a result of executing a process corresponding to the content of a request to the external apparatus in the form of page information.

The web server unit 328 includes the page generation unit 306, a PDF transfer unit 307, a print setting generation unit 308, and a notification unit 309. The page generation unit 306 is a module for generating page information for providing a result of executing an accepted request to an external apparatus. When the web server unit 328 receives a PDF-format file, which is print target data, from an external apparatus, the PDF transfer unit 307 executes processing to store the received file. More specifically, the file management unit 311 executes a process of storing a PDF 312 via the file system unit 329.

The print setting generation unit 308 is a module that executes a process for a case where the web server unit 328 receives from an external apparatus a request that includes print settings. This corresponds to a case where the web server unit 328 receives a set of print settings that corresponds to a folder in a hot folder creation process. In this case, the print setting generation unit 308 uses a format conversion unit 325 provided in the hot folder function unit 321 to make a conversion to a JDF-format file 313, and then stores the converted data via the file management unit 311 of the file system unit 329.

The notification unit 309 is a module for generating a notification event between modules when the web server unit 328, triggered by accepting a web request from an external apparatus, executes a process inside the multifunctional peripheral 101. Specifically, the hot folder function unit 321 is a module that controls timings of the execution of a series of processes such as print processing, a folder hierarchy moving process, and processes for generating and replying with rendering information attached thereto, in response to requests received by the web server unit 328.

The web server unit 328, in conjunction with the authentication unit 304, is further capable of executing an authentication process for realizing user access control with respect to web services provided via the web server unit 328. When executing the authentication process, the web server unit 328 performs matching against the user DB 305 included in the authentication unit 304, based on the received user information, and determines whether authentication succeeded. The authentication unit 304 permits the user to use various web services provided via the web server unit 328 only when the authentication is successful.

The print control unit 330 is a module that controls the printer unit 314 and a media management unit 315 included in the multifunctional peripheral 101, forms an image on a sheet based on print target data, and performs a series of controls for processing the sheet. The print control unit 330 is further divided into a plurality of sub modules such as a job execution unit 316, the print queue management unit 319, the job registering unit 320, and the hot folder function unit 321.

The job execution unit 316 is a module that collectively manages and executes print control that is generated in the multifunctional peripheral 101 in a unit of print data called a job. The print queue management unit 319 is a module for managing an execution order by adding an order to respective jobs managed by the job execution unit 316. The hot folder function unit 321 is a module for realizing a hot folder function. Print jobs generated by the hot folder function unit 321 are stored in the print queue management unit 319, via the job registering unit 320, in the order in which they were generated.

The print queue management unit 319 instructs the job execution unit 316 to execute the first job of jobs that the print queue management unit 319 manages. Specifically, first, an image generation unit 317 rasterizes image data such as the PDF 312, which is a print target of the job. A print setting unit 318 analyzes print settings and media settings written in the JDF (Job Definition Format) 313 or the like. Further, the job execution unit 316 controls the printer unit 314 and the media management unit 315, and executes a process of forming an image of the above rasterized image data on a sheet in accordance with analyzed commands. As a result, a series of product generation processes is executed. When the product generation process by the job execution unit 316 completes, the print queue management unit 319 is controlled to sequentially execute similar control for the next jobs. Such processes are controlled to be processed in order until all of the jobs managed by the print queue management unit 319 have been completed.

The hot folder function unit 321 is a module for realizing the in-device hot folder function in the multifunctional peripheral 101, and is a function provision unit. A function group configured by the in-device hot folder function provided by the hot folder function unit 321 includes a process related to creating a hot folder, a process related to executing an inputted print job, and a process of setting the in-device hot folder function itself. Further, the function group includes a process of presenting an operation screen to the operation unit 327 in order for these functions to be instructed.

Further, the in-device hot folder function of the present embodiment is characterized in that print target data is received via the web server unit 328. Therefore, execution of a print job is instructed by a browser-based notification unit 324 receiving a print processing execution trigger from the notification unit 309, which is managed by the web server unit 328, and the job registration requesting unit 323 registering it in the job registering unit 320.

The program generation unit 331 included in the hot folder function unit 321 generates a program to be provided to the client apparatus, such as a confirmation screen display program to be described later. As described above, the print result management unit 332 receives the print completion notification from the print queue management unit 319, and registers the print result in the print history stored in the RAM 402.

<Multifunctional Peripheral Configuration>

Figure 4A:
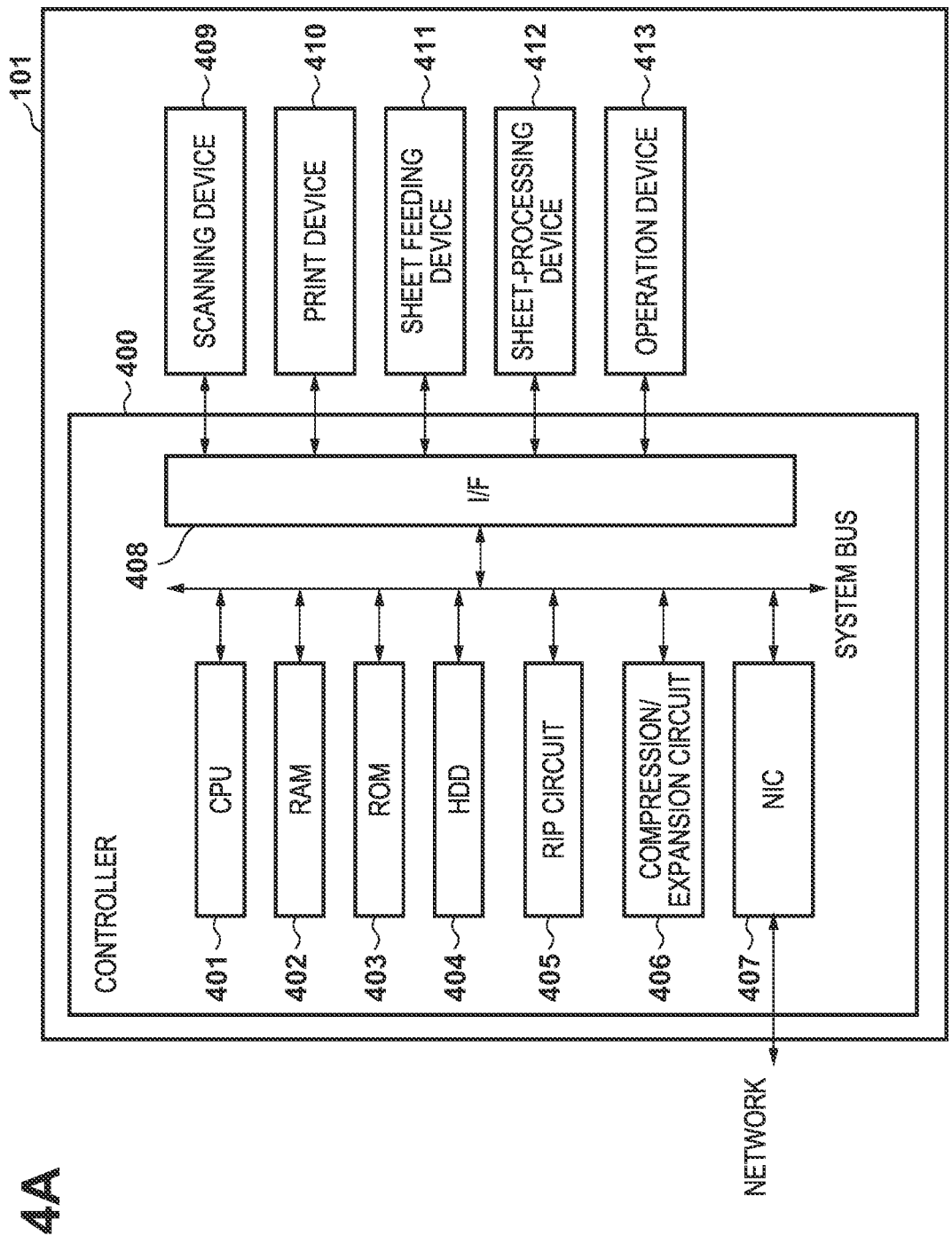

Next, referring to FIG. 4A and FIG. 4B, the configuration of the multifunctional peripheral 101 will be described. FIG. 4A shows a hardware configuration of the multifunctional peripheral 101, and FIG. 4B shows a software configuration of the multifunctional peripheral 101. The multifunctional peripheral 101 has a reading function of reading an image on a sheet and a print function of printing an image onto a sheet. The multifunctional peripheral 101 has a post-processing function of binding a plurality of sheets onto which images have been printed, aligning a plurality of sheets, and dividing a discharge destination of a plurality of sheets among a plurality of trays. A sheet includes paper such as plain paper or cardboard, a film sheet, and the like.

Furthermore, the multifunctional peripheral 101 has a file-sharing function that can be used by client apparatuses such as a PC 102, a PC 103, and the mobile terminal 104. The file sharing function that the multifunctional peripheral 101 has is configured to be usable through the web-information-access function described above. Details of the file sharing function, the web-information-access function, a program configuration for providing these functions in each device, and usage methods that involve these will be described later. It should be noted that the functionality of the multifunctional peripheral according to the present embodiment is not intended to be limited to these functions, and other functions, for example, a function of transmitting image data or the like, may be included.

The multifunctional peripheral 101 includes a controller 400, a scanning device 409, a print device 410, a sheet feeding device 411, a sheet-processing device 412, and an operation device 413. The controller 400 includes a CPU 401, a RAM 402, a ROM 403, a HDD 404, a RIP circuit 405, a compression/expansion circuit 406, a NIC 407, and an interface 408. The multifunctional peripheral 101 is a device for conveying a medium (e.g., paper or sheet) contained in the sheet feed unit, and forming an image of expanded image data onto the medium using toner. Configuration is such that apparatuses having a plurality of different roles are connected to each other so as to enable complicated sheet processing. The multifunctional peripheral 101 according to the present embodiment includes a non-volatile memory such as the hard disk drive (also referred to below as HDD) 404 that is capable of storing data of a plurality of jobs that are to be processed in the device. In the present embodiment, description is given by taking as an example the multifunctional peripheral 101 which uses a hard disk, but there is no limitation to a hard disk as long as there is a similar large-capacity non-volatile storage apparatus.

The multifunctional peripheral 101 is provided with a copying function for printing, by the print device 410 and via the HDD 404, job data accepted from the scanning device 409. Further, the multifunctional peripheral 101 is provided with a print function of printing job data accepted from an external apparatus via the interface 408 by the print device 410 via the HDD 404, and the like. The multifunctional peripheral 101 according to the present embodiment is an MFP-type printing apparatus (also referred to as an image forming apparatus) having a plurality of functions. As long as various controls described in the present embodiment can be executed, the multifunctional peripheral 101 of the present embodiment may have any configuration, and may be a printing apparatus capable of color printing or a printing apparatus capable of monochrome printing.

The scanning device 409 reads a document image and performs image processing on the read image data. The interface 408 transmits and receives image data and the like to and from a facsimile machine, a network connected device, or an external dedicated device. The HDD 404 stores image data of a plurality of jobs to be printed, accepted from one of the scanning device 409 and the interface 408. Therefore, the multifunctional peripheral 101 according to the present embodiment can print, by the print device 410 via the HDD 404, job data accepted from the scanning device 409 (copying function). Further, the multifunctional peripheral 101 can print, by the print device 410 via the HDD 404, job data accepted from an external apparatus via the interface 408 (print function). The multifunctional peripheral 101 according to the present embodiment is an MFP-type printing apparatus (also referred to as an image forming apparatus) having a plurality of functions.

The HDD 404 also stores, for example, various types of management information that are permanently stored, changed, and managed by the multifunctional peripheral 101 according to the present embodiment. The print device 410 executes a process for printing, on a print medium, data of a job to be printed, which is stored in the HDD 404. The operation device 413 is a display unit corresponding to an example of a user interface.

The CPU 401 collectively controls processes, operations, and the like of various units included in the multifunctional peripheral 101. The ROM 403 stores various control programs required in the present embodiment, including programs for executing various processes of flowcharts to be described later. The ROM 403 also stores display control programs for displaying various UI screens on the display unit of the operation device 413, including user interface screens (hereinafter referred to as UI screens) that are illustrated.

The CPU 401 causes the multifunctional peripheral 101 to execute various operations described in the present embodiment by reading and executing programs of the ROM 403. The ROM 403 is a read-only memory in which programs such as a boot sequence and font information, and various programs such as the above-mentioned programs are stored in advance. In addition, the ROM 403 stores a file server function program for exposing the file system provided by the multifunctional peripheral 101 and making it accessible to client apparatuses. The ROM 403 also stores a web program and the like for providing functionality based on a web page via a web server provided in the multifunctional peripheral 101 that is accessed using a web browser. The ROM 403 also stores an in-device hot folder program that provides the in-device hot folder function to a client apparatus via a web access function. The various programs stored in the ROM 403 will be described later in detail.

The RAM 402 is a memory that can be read from and written to, and stores image data, various programs, and setting information transmitted from the scanning device 409 or the interface 408. The HDD 404 is a large-capacity storage apparatus that stores image data compressed by the compression/expansion circuit 406, raster image data acquired by the RIP circuit 405 expanding print data, and the like. The HDD 404 holds a plurality of pieces of data such as print data of jobs to be processed. The CPU 401 controls data of a job to be processed, which is input via various input units such as the scanning device 409 and the interface 408, so that the data of the job can be printed by the print device 410 via the HDD 404. The CPU 401 also controls to enable transmission to an external apparatus via the interface 408. In this manner, the CPU 401 performs control so as to be able to execute various types of outputting processing on data of jobs to be processed that are stored in the HDD 404. Further, the CPU 401 is configured to be able to, for a file system constructed inside the HDD 404, realize functionality of performing file sharing or transmission/reception with respect to an external apparatus, by reading out and executing programs from the ROM 403.

The RIP circuit 405 is configured to include a RIP (Raster Image Processor) circuit for converting received print data into raster image data. The compression/expansion circuit 406 performs compression and decompression operations on image data or the like that is stored in the RAM 402 or the HDD 404 by various compression methods such as JBIG or JPEG. With the above-described configuration, the CPU 401 as an example of a control unit included in the present printing system also controls the operation of the sheet-processing device 412.

The NIC 407 is a network interface card connected to the LAN 105 and for inputting and outputting image data and apparatus information. The interface 408 is, for example, a serial bus interface for USB, a LAN, or the like, and is connected to the scanning device 409 and the print device 410. The scanning device 409 is a scanner that includes an auto document feeder. Light is irradiated onto a bundle of document images or a document image of one sheet by a light source (not shown), and an original reflected image is formed on a solid-state imaging device such as a CCD (Charge Coupled Device) sensor by a lens. Then, a raster image reading signal is acquired as image data from the solid-state imaging device. The image data is transferred via the interface 408, and stored in the HDD 404.

The print device 410 is a part for forming an image onto a sheet, and a typical operation principle is as follows. A light beam such as a laser beam modulated in accordance with image data is caused to be incident on a rotating polygonal mirror (a polygonal mirror), and irradiated onto a photosensitive drum as reflected scanning light through a reflecting mirror. A latent image formed on the photosensitive drum by the laser beam is developed by toner, and the toner image is transferred to the sheet material, in other words the medium, adhered to the transfer drum. By sequentially executing this sequence of image forming processes for yellow (Y), magenta (M), cyan (C) and black (K) toner, a full color image is formed. Configuration may be taken such that, in addition to the four colors, a toner referred to as a special color, a transparent toner, or the like can be transferred. The sheet material on the transfer drum onto which the full-color image is formed is then conveyed to a fixing device. The fixing device is configured by a combination of a roller and a belt, and incorporates a heat source such as a halogen heater, and, by heat and pressure, melts and fixes the toner onto the sheet material onto which the toner image was transferred.

The sheet feeding device 411 is a device including a cassette or a tray for storing media such as paper or OHP sheets that are used for printing, and feeds stored media to the print device 410. The sheet-processing device 412 is an apparatus for acquiring a product acquired by performing various processes on a medium after image formation by the print device 410. The various types of processing include stapling processing in which the ends of a bundle of media conveyed to the sheet-processing device 412 are closed with staples, and the like. Also included is a bookbinding process in which a center portion of a bundle of media similarly conveyed to the sheet-processing device 412 is bound by staples and folded along the staples. In addition, a stapleless binding process or the like is included in which the end of a bundle of media conveyed to the sheet-processing device 412 is closed by applying pressure with a tooth pattern. Further, punching processing for performing a punch pressing process at an end of a medium conveyed to the sheet-processing device 412 is included.

The operation device 413 provides various interfaces for when an operator performs various settings and operations of the multifunctional peripheral 101 according to the present embodiment.

Next, referring to FIG. 4B, the configuration of the software (programs) of the multifunctional peripheral 101 will be described. These programs are stored in the ROM 403, read out by the CPU 401 of the multifunctional peripheral 101, and executed.

A boot loader 601 is a program that is executed immediately after the power of the multifunctional peripheral 101 is turned on. These programs include programs for executing various startup sequences necessary for startup of the system. An operating system 602 is a program whose purpose is to provide an execution environment for various programs for realizing the functions of the multifunctional peripheral 101. This mainly provides the functions of managing the memories of the multifunctional peripheral 101, namely resources such as the ROM 403, the RAM 402, and the HDD 404, and basic input/output control of the other components shown in FIG. 4A.

A network control program 603 is a program that is executed when data is transmitted to or received from a device connected via a network. This program is used at the time of execution of various processes such as reception processing of a file to be printed, transmission of data from an external apparatus, transmission and reception of commands, and the like. The network control program 603 also includes a driver program for controlling the NIC 407.

A file system server 604 is a server program for providing an external apparatus connected via a network with requests for file creation, transmission, reception and the like, with respect to files in the HDD 404 of the multifunctional peripheral 101. By the program being activated and operating, an external apparatus such as the PCs 102 and 103 and the mobile terminal 104 which are connected to the network can, via the network, use files in the HDD 404 and services provided by the file system.

A web server 605 is a program for providing a server function in which a web service provided in accordance with web content and a web program comprised by the multifunctional peripheral 101 can be used by an external apparatus such as the PCs 102 and 103 and the mobile terminal 104 which are connected via the network. A hot folder function program 606 is a characteristic program that is provided by the multifunctional peripheral 101 according to the present embodiment. Specifically, this program, by the web server 605, detects reception of a request for a web service from a client apparatus connected to the network. Further, the program executes a series of functions provided as the in-device hot folder function in response to the detected reception of the request.

A JDF function program 607 is a program for executing a JDF print function executed by the CPU 401 in response to an instruction from the NIC 407 when JDF job data is received. In the JDF print function, the CPU 401 sequentially instructs the operation of respective devices described by FIG. 4A in an appropriate order based on a processing order and a processing condition written in this program. These devices include the sheet-processing device 412, the print device 410, the HDD 404, the compression/expansion circuit 406, the RAM 402, and the like. The program also includes a process for analyzing JDF job data received via the NIC 407, a process of determining, as a result of the analysis process, whether or not a setting that is incorrect for JDF is included, and program processing for performing, for example, a setting change for resolving an incorrect setting.

A PDL print function program 608 executes a PDL print function which is executed by the CPU 401 when PDL data (print job data) is received. In the PDL print function which is performed by the CPU 401, the CPU 401 sequentially instructs the operation of respective devices described by FIG. 4A in an appropriate order based on a processing order and a processing condition written in this program. These devices include the sheet-processing device 412, the print device 410, the HDD 404, the compression/expansion circuit 406, the RAM 402, and the like.

A media management program 609 is a program for executing a management function related to sheets that can be used by the multifunctional peripheral 101. Sheet-related information managed by the program is stored in the HDD 404. A user authentication program 610, based on usage rights setting information of a user who uses the multifunctional peripheral 101, executes control for limitation and permission/prohibition of usage of the multifunctional peripheral 101 and the functions that it provides. The user authentication program 610 firstly executes an authentication process, and based on the result of the authentication process, executes the above-described function usage permission/prohibition, processing for controlling usage, and the like. The authentication process can be performed via the operation device 413 provided in the multifunctional peripheral 101, or via web screens provided through a web browser on the PCs 102 and 103, the mobile terminal 104, or the like.

A print job queue management program 611 is a program responsible for job generation through print processing, post-printing processing, generation of job management information that includes confirmation of a job status in the course thereof, and the like. Specifically, the above-described JDF function program 607, PDL print function program 608, hot folder function program 606, and the like each receive a print request, generate a print job, and manage the life cycle of processing for executing the generated print job. These programs also include a process of managing execution order in accordance with an order of job execution requests with respect to a region of the HDD 404 or the like temporarily, in order to sequentially process job data generated in the multifunctional peripheral 101. Other programs 612 includes a program group that does not correspond to any of the programs described above among the programs stored in the ROM 403 that can be executed by the multifunctional peripheral 101, but detailed descriptions thereof are omitted.

<Hardware Configuration of Client Apparatus>

Figure 5A:
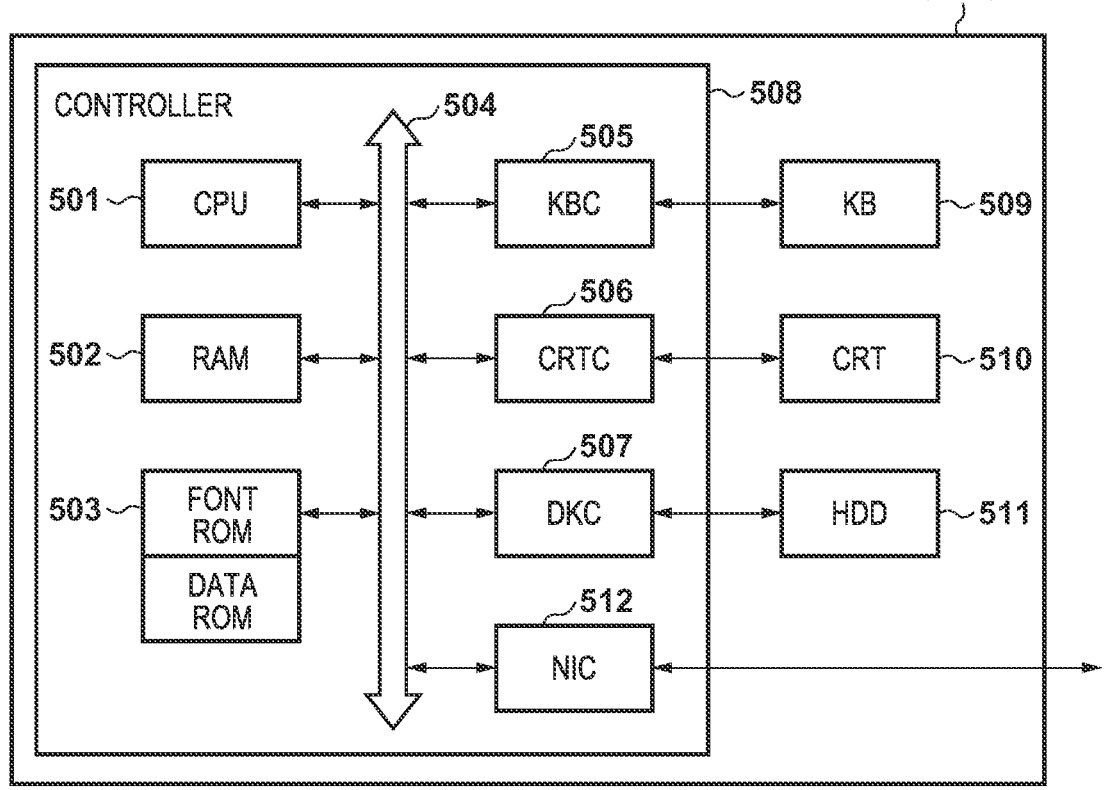
FIGS. 5A and 5B are block diagrams for explaining a configuration of a client apparatus.
Figure 5B:
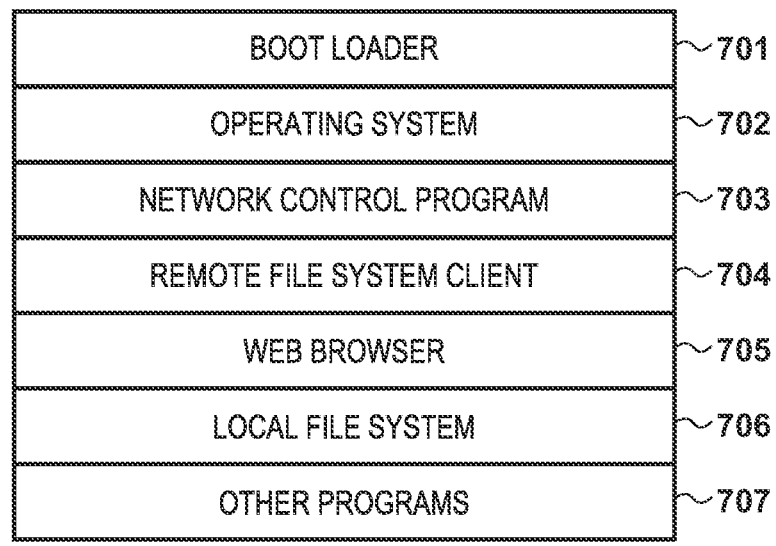

Next, referring to FIG. 5A and FIG. 5B, configurations of the client apparatus, i.e., the PCs 102 and 103 and the mobile terminal 104 in FIG. 1 will be described. FIG. 5A shows a hardware configuration of the client apparatus, and FIG. 5B shows a software configuration of the client apparatus. The client apparatus includes a controller 508, a keyboard (KB) 509, a display unit (CRT) 510, and a HDD 511. The controller 508 includes a CPU 501, a RAM 502, a ROM 503, a keyboard controller 505, a display controller (CRTC) 506, a disk controller 507, and a NIC 512. These components are connected through a bus 504 so that they can transmit signals to each other.

The CPU 501 executes a program stored in a program ROM of the ROM 503, and an OS or general application program loaded from the HDD 511 to the RAM 502. The ROM 503 also has a font ROM and a data ROM. The RAM 502 functions as a main memory, a work area, or the like of the CPU 501. The keyboard controller (KBC) 505 controls input from a keyboard or a pointing device (not shown). The display controller (CRTC) 506 controls display with respect to the display unit (CRT) 510. The disk controller (DKC) 507 controls accesses to the HDD 511 which stores boot programs, various applications, font data, and the like. The NIC (network controller) 512 is connected to a network and executes communication control processing with respect to another device connected to the network. The bus 504 is connected to the CPU 501, the RAM 502, the ROM 503, various controllers, and the like, and conveys data signals and control signals.

In the case of a mobile terminal, a touch panel controller or the like may be included in the configuration instead of the keyboard controller (KBC) 505. In addition, a bulk storage unit may be provided instead of the HDD 511. Further, the NIC 512 has an internal configuration that differs between the cases where the apparatus includes a wired LAN, includes a wireless LAN, or includes both. However, the differences due to these internal configurations are concealed inside the NIC 512, and the system is configured to be controllable as equivalent to the other modules shown in the same figure.

Next, referring to FIG. 5B, the configuration of software (programs) held by the PCs 102 and 103 and the mobile terminal 104, which are client apparatus, will be described.

A boot loader 701 indicates programs that are executed immediately after the power of the PCs 102 and 103 and the mobile terminal 104 is turned on. These programs include programs for executing various startup sequences necessary for startup of the system. An operating system 702 is a program whose purpose is to provide an execution environment for various programs for realizing the functions of the PCs 102 and 103 and the mobile terminal 104. This provides functions such as for resource management of the memories of the PCs 102 and 103 and the mobile terminal 104, that is, the ROM 503, the RAM 502, the HDD 511, and the like.

A network control program 703 is a program that is executed when data is transmitted to and received from a device connected via a network. This program can be used when a file system executes transmission of a file to be printed. A remote file system client 704 and the web browser 705, which will be described later, are used subordinately when the functions provided by the file system server 604 and the web server 605 held by the multifunctional peripheral 101 connected via the network are used.

The remote file system client 704 is a program that operates on the client apparatus side when executing processing for transmitting or receiving a file to or from an external device, such as the multifunctional peripheral 101 connected via the network, using the network control program 703. This program is for executing processing on the client when accessing a function of a file server provided by an external device connected via a network, to use the function of the file server. The remote file system client 704 accesses a file server provided by an external device connected to the network via the NIC 512, and enables file transmission/reception, copying, and the like.

The web browser 705 is a client program for a case of using a web service that is provided by an external apparatus and is operated by the web server 605, where the external apparatus is an external device connected via the network. The web browser 705 may be provided in advance in the apparatus as a part of the functions of the operating system, in the case of a general-purpose operating system. On the other hand, since a web browser is also an application program that operates on a general-purpose client apparatus, it is also conceivable that a user of the client apparatus could install and use any web browser application. In the present embodiment, the form in which the web browser 705 is provided on the client apparatus is not relevant.

A local file system 706 is a file management function program that executes file management such as creation, editing, deletion, and the like of various files stored in the HDD 511. In combination with the remote file system client 704 described above, the local file system 706 accesses the file system server 604 of an external apparatus connected via the network, and copies a file managed by the file system 706 to a remote apparatus (external apparatus). A network file management function such as the reverse of above: copying a file on the remote apparatus side to the local file system 706, is realized.

Other programs 707 include a group of programs that do not correspond to any of the above, but detailed description thereof is omitted. Note that there may be a form in which various programs such as the above-described local file system 706, remote file system client 704, network control program 703, and web browser 705 are provided as a part of the operating system 702. Irrespective of whether or not the operating system 702 includes the various functions described above as its own functions, the present embodiment applies as long as the client apparatus has these functions.

Correspondence among the software/hardware configurations provided by the respective systems of the client apparatus (102, 103, 104), and the multifunctional peripheral 101 shown in FIG. 3 through FIG. 5B and described above, is as described below. The operation unit 327 is realized by the CPU 501 executing the web browser 705 together with control of input/output devices such as a KB 509, a CRT 510, a CRTC, and a KBC 505. The web server unit 328 is realized by the CPU 401 executing the web server 605. The file system unit 329 is realized by the CPU 401 executing the file system server 604 and the network control program 603.

The printer unit 314 is realized by the CPU 401 executing the JDF function program 607 and the CPU 401 controlling various print devices, in other words the print device 410, the compression/expansion circuit 406, and the sheet-processing device 412. The media management unit 315 is a functional unit that controls a sheet in a manner suitable for an image forming process performed by the printer unit 314. The media management unit 315 is realized by the CPU 401 executing the media management program 609 and controlling the sheet feeding device 411 and the sheet-processing device 412.

The hot folder function unit 321 is realized by the CPU 401 executing the hot folder function program 606. The job execution unit 316 is realized by the CPU 401 executing the JDF function program 607. The print queue management unit 319 and the job registering unit 320 are realized by the CPU 401 executing the print job queue management program 611.

<Description of Web Browser Screen for Login>

Next, with reference to FIG. 6A and FIG. 6B, description will be given for an initial screen that is displayed on a web browser screen as a result of a web request transmitted to the multifunctional peripheral 101 when the web server 605 uses the hot folder function program 606.

When the PCs 102 and 103 and the mobile terminal 104 access the hot folder function program 606 included in the multifunctional peripheral 101 via the web browser 705, an authentication request screen shown in FIG. 6A is first displayed on the web browser screen. This screen displays a user name field 801 which is information necessary for authentication, a password input field 802 corresponding to the user name, a login destination, namely an authentication server selection field 803, and a login button 804.

When the user of the hot folder function program has appropriately inputted user information, as shown in FIG. 6B, into the respective fields provided by this screen and then presses the login button 804, the authentication process is executed by the user authentication program 610. The authentication information required for the authentication process of the user authentication program 610 is transmitted from the web browser 705 to the user authentication program 610 via the web server 605 of the multifunctional peripheral 101 through the network.

<Description of Web Browser Screen for Folder Display>

Next, referring to FIG. 7A-FIG. 7E, description is given of examples of the in-device hot folder function screen displayed on the web browser screen when authentication is successful.

Figure 7A:
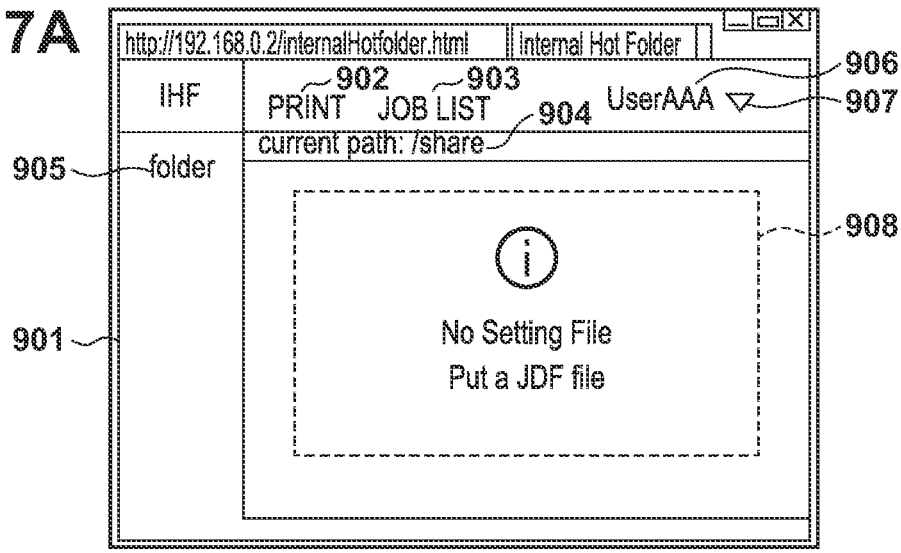
FIGS. 7A-7E are views showing examples of web pages, to be displayed on the web browser 705, that have a function of hierarchically displaying and creating folders.

FIG. 7A shows the initial status of the web browser screen of the hot folder function. Screen components displayed on the web browser screen will be described with reference to the same figure. However, description of screen components typically provided by the web browser function itself, such as an address display part of the web browser screen and the title tabs of respective web pages, which are not related to the hot folder function according to the present embodiment, will be omitted. A screen for default functions that is displayed immediately after passing through the authentication process shown in FIG. 6A and FIG. 6B is the screen shown in FIG. 7A.

A folder display area 901 is a hierarchy management function area which is managed by the file system server 604 included in the multifunctional peripheral 101 via the web browser screen of the web browser 705, and enables an operation such as movement or display of a hierarchy on the file system, and creation of a new folder. A print function selection button 902 is a button used when a print function is selected from among various functions provided by the hot folder function.

A job list display button 903 is a button for transitioning to a screen for displaying a list of print jobs that have been inputted to the multifunctional peripheral 101 via the hot folder function. A current path display area 904 is an area for displaying a process target, that is, a current path in an absolute path format from a root folder in a case where the file system server 604 of the multifunctional peripheral 101 is accessed by the web browser 705. In FIG. 7A, that the current path is "/share" is illustrated. This is a state in which the state of the highest hierarchy of a public folder managed by the file system server 604 of the multifunctional peripheral 101 in the present embodiment is displayed on the web browser screen. It is not possible to move to a higher hierarchy than "/share" which is the highest hierarchy of publicly available folders, and the file system server 604 of the multifunctional peripheral 101 in this embodiment does not allow a user to create a folder just below the folder of the highest hierarchy. FIG. 7A shows an example of a screen that satisfies this behavior.

A folder button 905, which is a destination folder designation button, is a button corresponding to a folder under the present folder. A number of destination folder designation buttons corresponding to the number of folders in the hierarchy of the current folder are displayed, each button has the name of the respective folder, and when selected, a folder screen request process is performed, and there is a transition to the screen of the folder indicated by the name. That is, the folder button 905 is a button for transitioning to a screen for "/share/folder". The folder screen request process will be described with reference to FIGS. 13A, 13B and 14.

A logged-in user display area 906 is an area for displaying the user name inputted at the time of authentication using the web browser screen shown in FIG. 6A and FIG. 6B. A user-specific function selection button 907 is a button for instructing a transition to various function providing screens customized for each login user.

A folder type display area 908 is a characteristic screen area in the present embodiment, and is an area for providing information to enable a determination as to whether or not a folder on the file system server 604 indicated by the path displayed in the current path display area 904 is a hot folder. In the example of the screen shown in FIG. 7A, it is illustrated that the folder on the file system server 604 corresponding to "/share" of the current path is not a hot folder. In this state, even if an operation for performing a file transmission process to be described later is performed, transmission of a file is not performed.

Figure 7B:
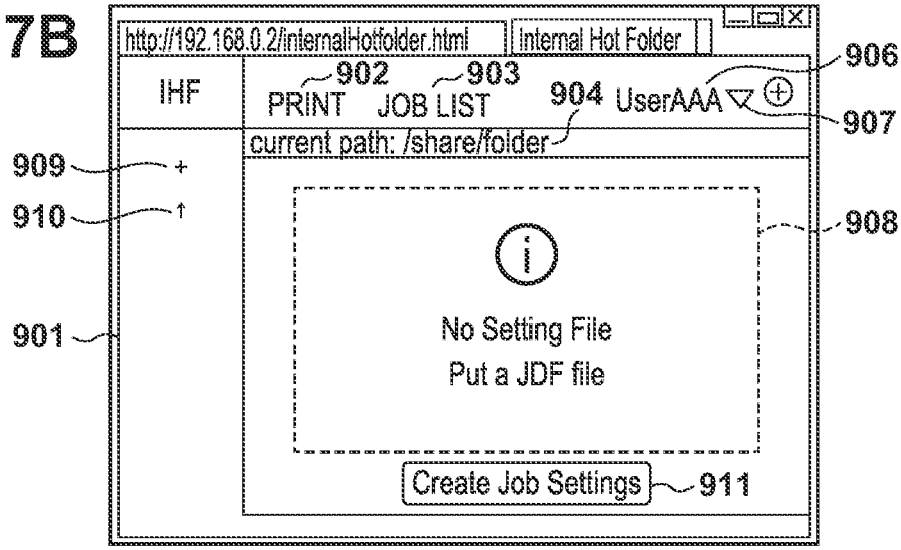

FIG. 7B shows an example of a screen state that is transitioned to immediately after the folder button 905 which is a destination folder designation button is selected in the screen state shown in FIG. 7A. It is a screen displayed after transitioning from "/share" as illustrated in FIG. 7A to "folder" which is directly under that, and "/share/folder" is displayed in a current path display area 904. The file system server 604 of the multifunctional peripheral 101 in the present embodiment is configured so that the user can create any folder or file in a folder lower than the uppermost folder. Therefore, unlike in FIG. 7A which shows the highest hierarchy, a folder creation button 909 and an upper hierarchical movement button 910 are displayed.

The folder creation button 909 is a button for creating a new folder in the present folder. The upper hierarchical movement button 910 is a button for transitioning from the current folder to a higher folder. When the upper hierarchical movement button 910 is selected, a folder screen request process for the folder of one level higher is performed. A print setting creation button 911 is a button for transitioning to a screen for arranging a print setting file in the present folder. The print setting creation screen which is the destination of this transition will be described with reference to FIG. 8A-FIG. 8F.

Figure 7C:
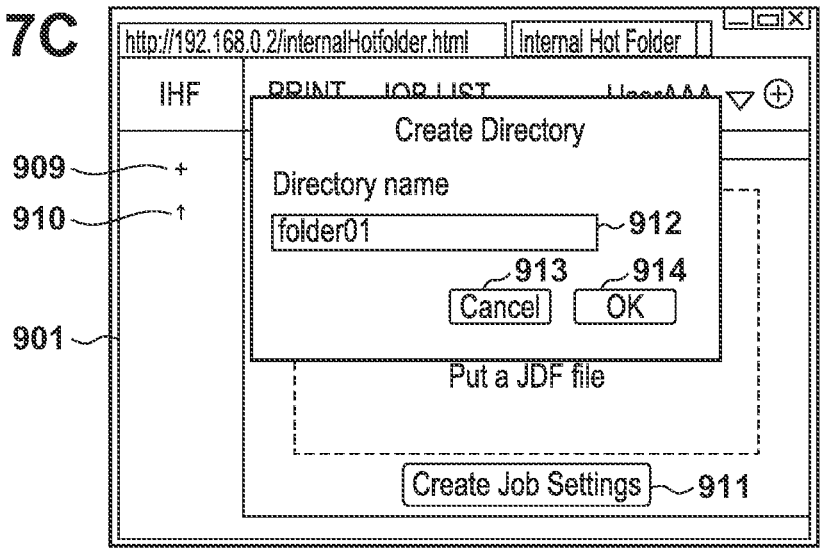

FIG. 7C shows an example of a state of a screen of the web browser that is displayed immediately after the folder creation button 909 is selected in FIG. 7B. A folder name input field 912 is an input field for inputting a name of a folder to be created. When an OK button 914 is pressed in a state where a text string of a desired folder name has been inputted, a folder having the same name as that described above is created immediately below the current path. When a cancel button 913 is pressed, the folder creation process is not executed, and the screen state returns to that of FIG. 7B which is the source of the transition. The OK button 914 can be selected when text has been input in the folder name input field 912. If the inputted folder name is the same as the name of an already existing folder, no folder is created.

Figure 7D:
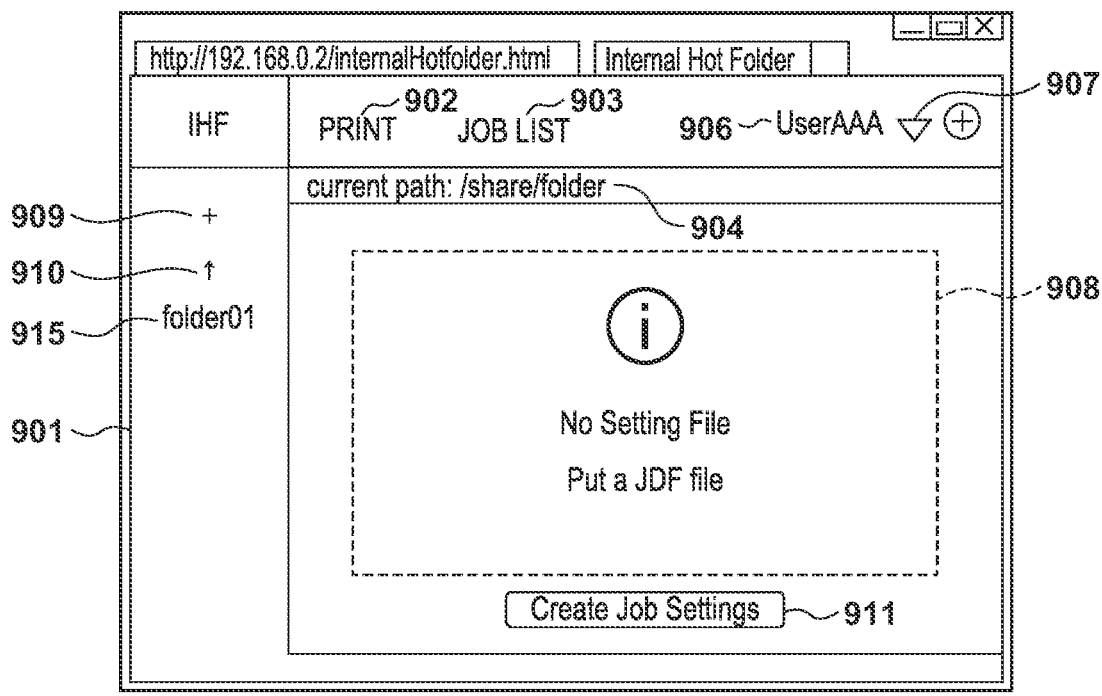

FIG. 7D shows an example of a state of a screen of the web browser that is displayed immediately after the OK button 914 is selected in FIG. 7C. As shown graphically, it can be confirmed by the addition of a folder01 button 915 to the folder display area that a folder named "folder01", which is the name of the folder created and indicated on the screen of FIG. 7C, has been newly created.

Figure 7E:
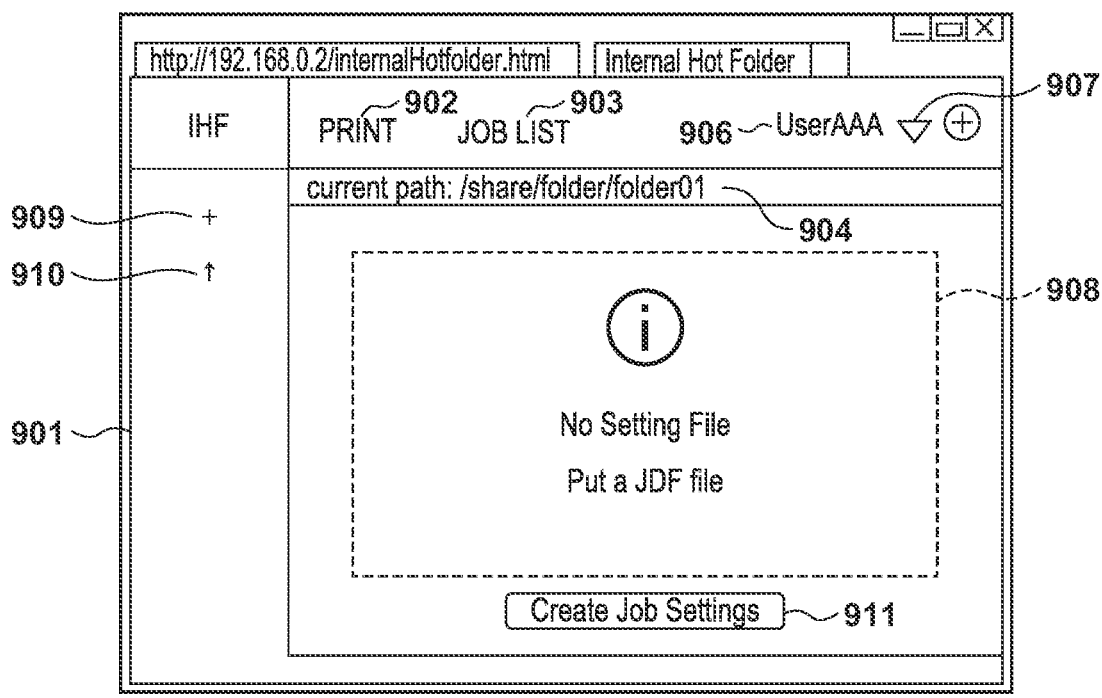

FIG. 7E shows an example of a state of a screen of the web browser that is displayed immediately after the folder01 button 915 is selected, when the screen displayed on the web browser is in the state shown in FIG. 7D. As shown in the figure, the current path display area 904 is "/share/folder/folder01". That is, it is confirmed that the current path has moved to the folder created by operating the screen components related to folder creation that were presented on the screens of FIG. 7C and FIG. 7D.

<Description of Web Browser Screen for Creating Print Settings>

Figure 8A:
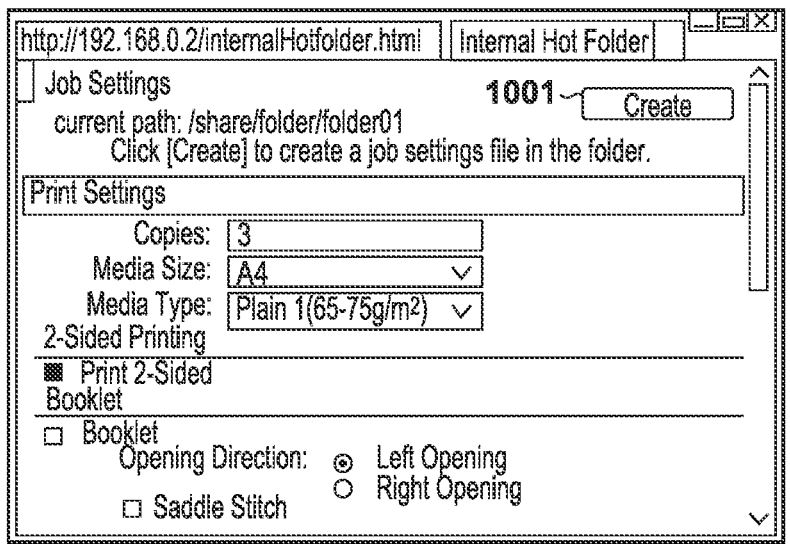
Figure 8B:
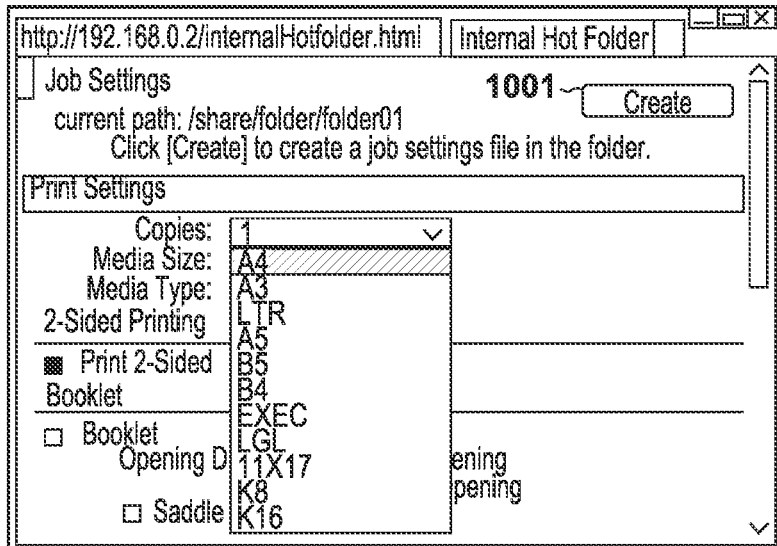
Figure 8C:
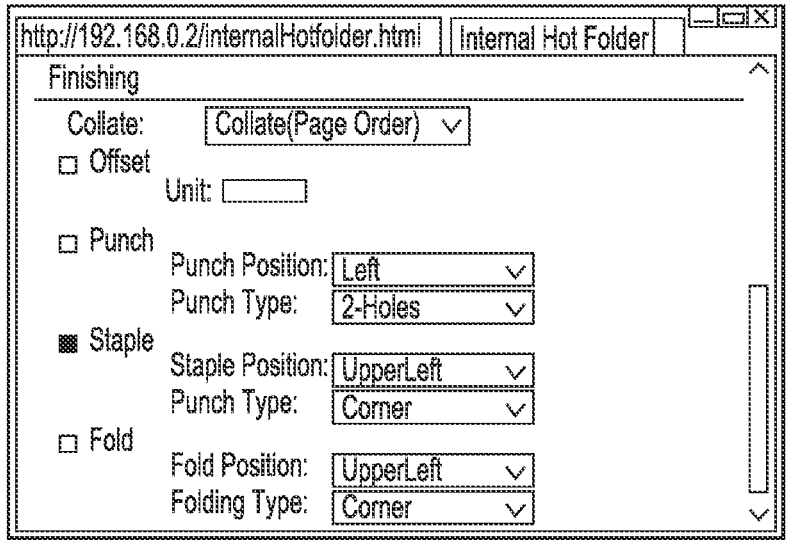

Next, referring to FIG. 8A-FIG. 8F, a web browser screen for print setting creation according to the present embodiment will be described. FIG. 8A-FIG. 8C are a print setting creation screen that is transitioned to by selecting the print setting creation button 911 in FIG. 7E. Function selection buttons, select boxes, and the like for selecting print settings that can be designated as the hot folder function of the multifunctional peripheral 101 are arranged. Each of FIG. 8A-FIG. 8C displays a part of the scroll-displayed screen because the display area of the web browser screen is limited. However, the present embodiment is not limited to this screen configuration, and may be displayed as a single screen by, for example, changing the display window size or changing the display character size. Because these are typical screen controls in a web browser, detailed description thereof will be omitted. The print settings that can be set on the print setting creation screen include designating a print setting, designating a number of copies and what paper is to be used, designating an output destination for the paper, designating a resolution, designating color or monochrome, making a designation relating to image processing at the time of printing such as a profile, and designating post-processing for printed sheets such as stapling and punch folding.

FIG. 8D shows an example where a folder for which print settings have been created on the print setting creation screens of FIG. 8A-FIG. 8C is displayed. In the folder type display area 908, information indicating that the folder is a "hot folder" in which the print function can be used is presented. In this state, a file transmission process can be performed by dragging and dropping a file held in one of the PCs 102 and 103 and the mobile terminal 104 to the folder type display area 908.

As described above, the current path "/share/folder/folder01" has been changed to a hot folder, and new function selection buttons (1002, 1003) are arranged on the web browser screen. A print setting confirmation button 1002 is a button for confirming print settings created for the folder. A temporary setting button 1003 is for making an instruction to transition to a function selection screen provided for the purpose of temporarily changing a print setting created for the folder and applying the settings in order to improve convenience when executing a print job.

FIG. 8E shows an example of an error-information presentation screen. This screen is a screen for notifying an error that can occur when a folder movement operation is performed with respect the hot folder function program 606 via the web server 605 using functionality of the web browser and folder movement provided by the web browser screen. Error information indicating that the designated folder does not exist, and information indicating that a normal folder operation as described above cannot be performed because of the error are presented in the folder type display area 908. The above-described error state is a case in which, when a first user is browsing a folder of a certain hierarchy on the web browser screen, another user deletes the same folder or changes the folder name, and the first user accesses the folder in this state. In this case, since the folder of the designated name does not already exist, it is possible to present screen information indicating an error as shown in the figure and notify the user accordingly. A similar error state also occurs when a user directly designates an address on a screen to display a file path that does not exist in the browser.

FIG. 8F is an example of print setting creation request data transmitted to the web server 605 when the print setting creation button 911 is selected. In the present embodiment, description is given for a case where print setting information is written in an XML format, but the print setting information may be in any format as long as the content of the print setting items set in FIG. 8A-FIG. 8C can be stored. When print settings are designated by the series of print setting creation screens shown in FIG. 8A-FIG. 8C, and a creation button 1001 is selected, the designated print settings are converted into XML-format data shown in FIG. 8F by JavaScript (registered trademark) or the like.

XML data 1005 comprises a plurality of parts, including an XML declaration portion 1006, a metadata portion 1007, a general print setting portion 1008, and a layout setting portion 1009, respectively. The XML declaration portion 1006 is a statement that must always be written to indicate that the data format is XML. The metadata portion 1007 is for describing information on a target folder, and in the illustrated example, address information or path information of a folder to which print settings are applied is written in a folder path portion 1004. The general print setting portion 1008 describes, for example, information on sheets used in printing, a number of copies, and a discharge method. The layout setting portion 1009 describes a printing surface or an order of printing surfaces, a number of surfaces, and the like. The content of the general print setting portion 1008 is increased or decreased in accordance with designated print settings. For example, when a stapling setting or a folding setting is designated, information corresponding to a stapling setting portion and a folding setting portion is added. The generated XML data 1005 is transmitted to the web server 605 by asynchronous communication by the aforementioned web browser program. The web server 605 transmits the received XML data to the hot folder function program 606, and the hot folder function program 606 analyzes the data and creates a JDF file for realizing the print designation included in the XML data.

<File System Configuration of Multifunctional Peripheral>

Figure 9A:
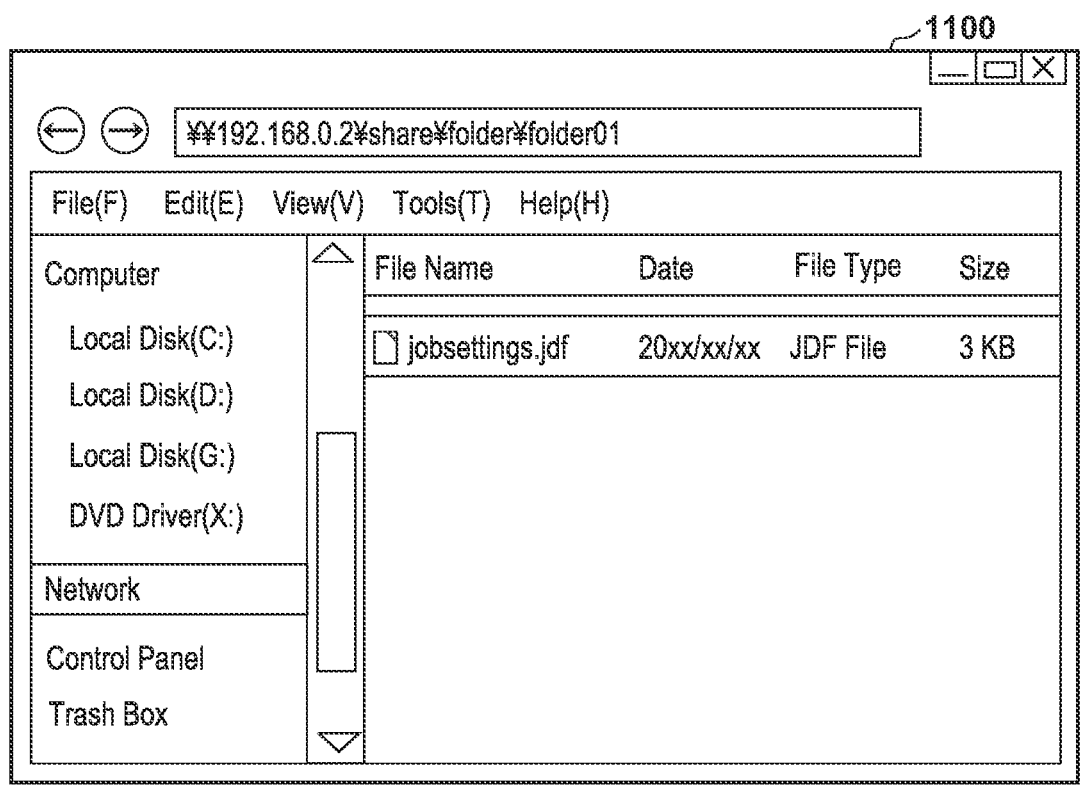
Figure 9C:
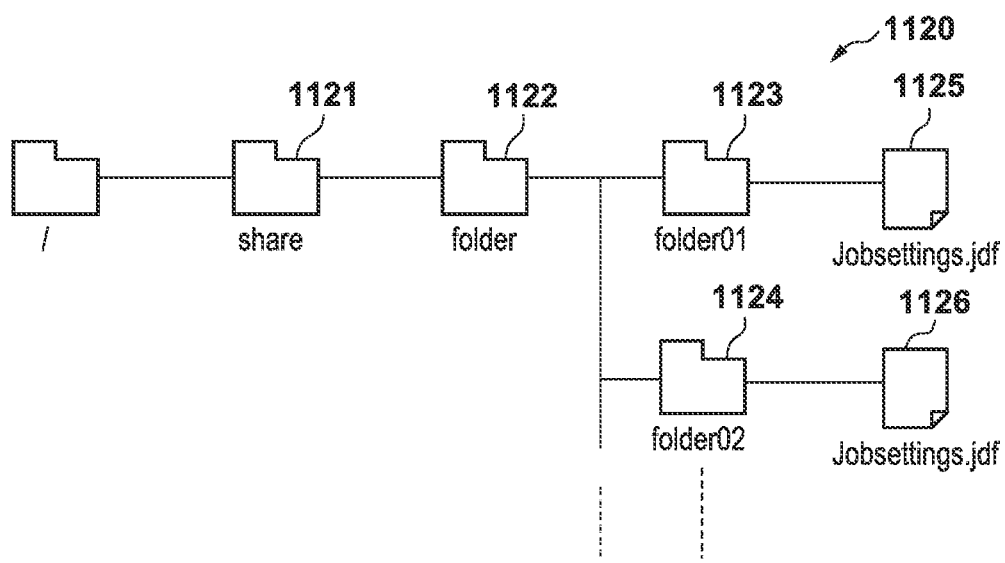

Next, referring to FIG. 9A to FIG. 9C, the configuration of the file system of the multifunctional peripheral 101 according to the present embodiment will be described. FIG. 9A is a client file system screen 1100 in which a folder configuration created on the HDD 404 of the multifunctional peripheral 101 is displayed on the CRT 510 of the client apparatus 102 via the file system server 604. In the folders where a print setting file is created from the print setting creation screen of FIG. 8A-FIG. 8F, it is possible to confirm that a JDF file is created as the print setting file.

FIG. 9B is an example of a JDF file. FIG. 9C is a schematic diagram showing a folder configuration in the HDD 404 of the multifunctional peripheral 101. A folder01 folder 1123 and a folder02 folder 1124 have been created by operations on FIG. 7A-FIG. 7E, and respective print setting files 1125 and 1126 have been created by operations on FIG. 8A-FIG. 8F. A share folder 1121 is a folder of the highest hierarchy, and a folder 1122 is at a hierarchy one below it.

<Description of Web Browser Screen for Application Settings>

Figure 10:
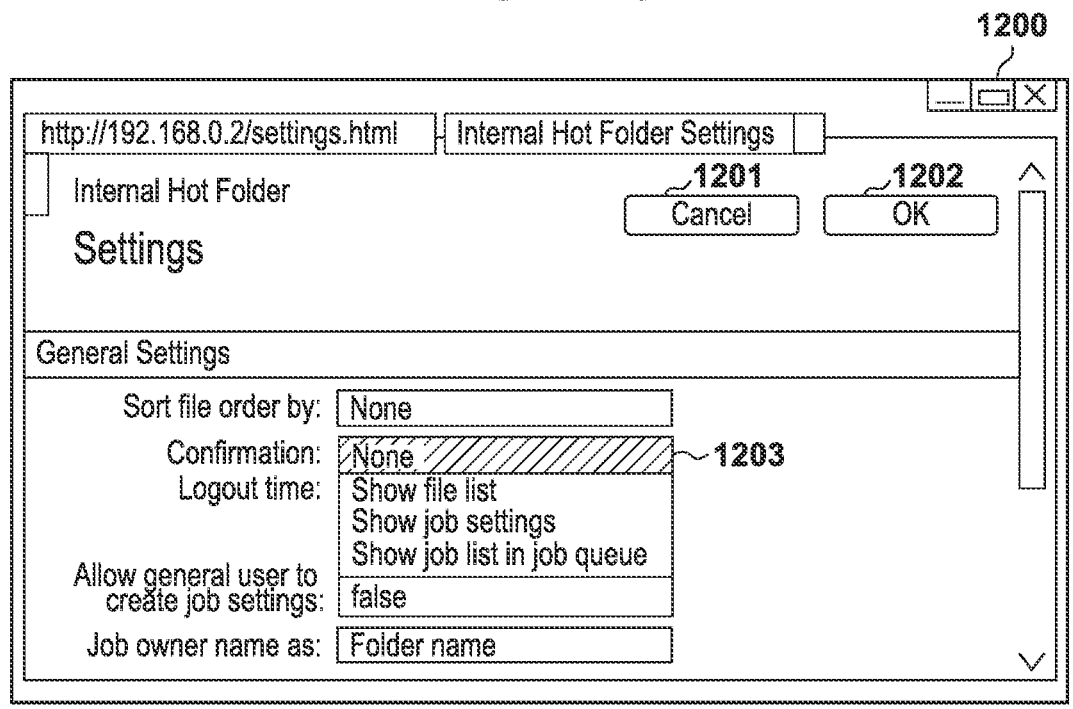
FIG. 10 is a view showing an example of a web page that has a function of setting an in-device hot folder and is to be displayed on the web browser 705.

Next, referring to FIG. 10, an application setting screen 1200 for setting operation of a program according to the present embodiment will be described. The screen can be acquired from the multifunctional peripheral 101 by the use of a browser from a client apparatus to access a predetermined address. Although there are many setting items in the application setting screen 1200, only items related to the confirmation screen display will be described here. Incidentally, when the application setting screen 1200 is opened, the initial selection state of the screen is the current setting value, and the initial selection status is an item indicating a setting stored in the RAM 402 in association with the user information.

A cancel button 1201 is a button for ending the application setting screen 1200. When the cancel button 1201 is selected, application settings performed in the application setting screen 1200 are not saved. Also, the web browser 705 transmits a request to display the folder screen of the transition origin to the web server 605, and transitions the screen in accordance with a response from the web server 605.

An OK button 1202 is a button for ending the application setting screen 1200. When the OK button 1202 is selected, the web browser 705 transmits a request for saving application settings made on the application setting screen 1200 to the web server 605. The request for saving application settings includes at least items and setting values for application settings that have been changed. Upon receipt the request for saving application settings, the web server 605 stores the setting values in the RAM 402 and HDD 404 in association with user identity information acquired from the request.

A confirmation screen display menu 1203 is a menu for designating whether to display a screen for confirming the content of the request or not to display anything before transmitting the print request to the web server 605 when the print request is accepted. In the confirmation screen display menu 1203:

Do not display the confirmation screen
Show a file list
Show print settings
Show jobs in the queue
are included as items to be selected.

When non-display of confirmation is selected (option "None" is selected) using the confirmation screen display menu 1203, a print request is transmitted without displaying the confirmation screen. For this reason, when the user accidentally selects an unintended file, and when the user transmits a print request for an unintended folder, or when many jobs exist in the queue and the user must wait until the start of printing, the user may not notice. On the other hand, by selecting the content to be displayed in the confirmation screen before the transmission of the print request using the confirmation screen display menu 1203, even if the user performs an erroneous operation, the user is enabled to notice the error before the execution of the print is started.

<Example of Confirmation Screen Display Program>

Figures 11C, 12A:
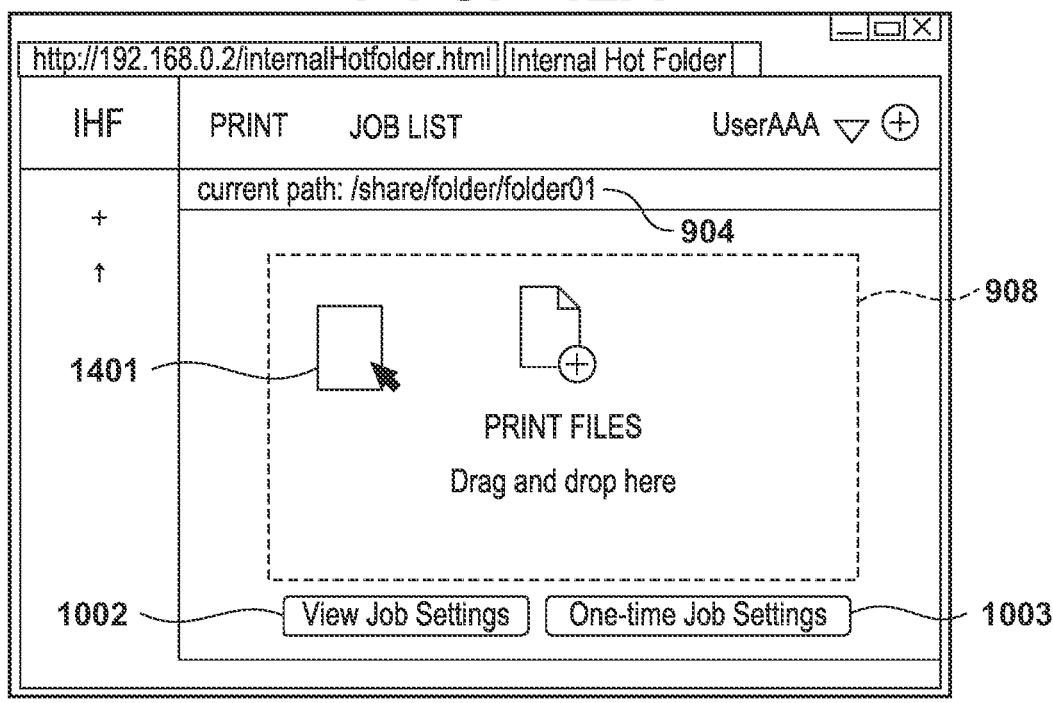

Next, referring to FIG. 11A-FIG. 11C, a program configured by JavaScript will be described as an exemplary program for displaying the confirmation screen when a file transmission request is accepted. A program running on the web browser 705 does not have to be JavaScript. In FIG. 11A-FIG. 11C, description related to the form of the web browser screen is omitted, and only explanation related to the description of the confirmation screen display program is shown.

A program 1300 shown in FIG. 11A is an example of JavaScript for generating a screen including a list of files for which print requests have been accepted. The program 1300 acquires information of a file for which a print request was accepted from a File object, which is a HTTP function. The information to be acquired is the name, size, and last update date/time of the file.

Program 1310 shown in FIG. 11B is an example of JavaScript for generating a confirmation screen including analysis results of print settings set for a target folder. The program 1310 acquires the print setting analysis result from the multifunctional peripheral 101 by using a JQuery AJAX communication. The path of the target folder is set as a parameter in a GET request, and a setting item name and a setting value designated for the setting item are acquired as analysis results.

The program 1320 shown in FIG. 11C is an example of JavaScript for generating a confirmation screen including a list of jobs currently printing or in a stand-by state in a job queue of the multifunctional peripheral 101. The program 1320 acquires the list of jobs from the multifunctional peripheral 101 by using JQuery AJAX communication. The information of the acquired jobs includes an input date/time, a standby number, a job name, a name of the person who inputted the job, and a state of the job.

As described above, the web server 605 determines JavaScript to be transmitted to the client apparatus (the web browser 705) in accordance with the settings of the confirmation screen display menu 1203. The web server 605 transmits the determined JavaScript (confirmation screen display program) to the client apparatus together with the screen information of the screen (job input screen) shown in FIG. 8D. The JavaScript transmitted from the Web browser 705 to the client apparatus operates on the web browser 705 when an instruction to print files is accepted from the user. When the JavaScript operates on the web browser 705, screens described later with reference to FIG. 12A to FIG. 12H are displayed.

<Description of Web Browser Screen for when a Print Job is Inputted>

Next, referring to FIG. 12A-FIG. 12H, description is given for examples of screens that are transitioned to immediately after files are arranged by an operation such as dragging and dropping into the folder type display area 908 of FIG. 8D using an instructing apparatus such as a mouse.

As stated in the description for FIG. 7E, the folder in which the current path is "/share/folder/folder01" is a hot folder, and is not simply a shared folder. This is a folder to which print settings have been linked (associated) by the series of operations shown in FIG. 8A-FIG. 8C. Therefore, when the above-described operation is performed with respect to this folder via a web browser 705, processing to transmit a print request and print target data from the web browser 705 to the web server 605 are executed. This processing is performed by the web browser 705 executing JavaScript (transmitted to the web browser 705 from the web server 605), as mentioned in the description of the hot folder function program 606 in FIG. 4B.

In the present embodiment, as described below, when the above-described operation is performed on a hot folder, control to display a confirmation screen is performed before the transmission of a print request and print target data is started in accordance with setting (confirmation screen display setting) performed using the application setting screen 1200 (the confirmation screen display menu 1203).

FIG. 12A shows an example of a screen displayed by the web browser 705 when an operation of dragging and dropping a file on the folder type display area 908 is performed using an instructing apparatus such as a mouse. A drag-and-drop display 1401 indicates that a drag-and-drop operation is in progress. This display is provided by the system of the client apparatus and is not necessarily as shown in the figure.

Figure 12B:
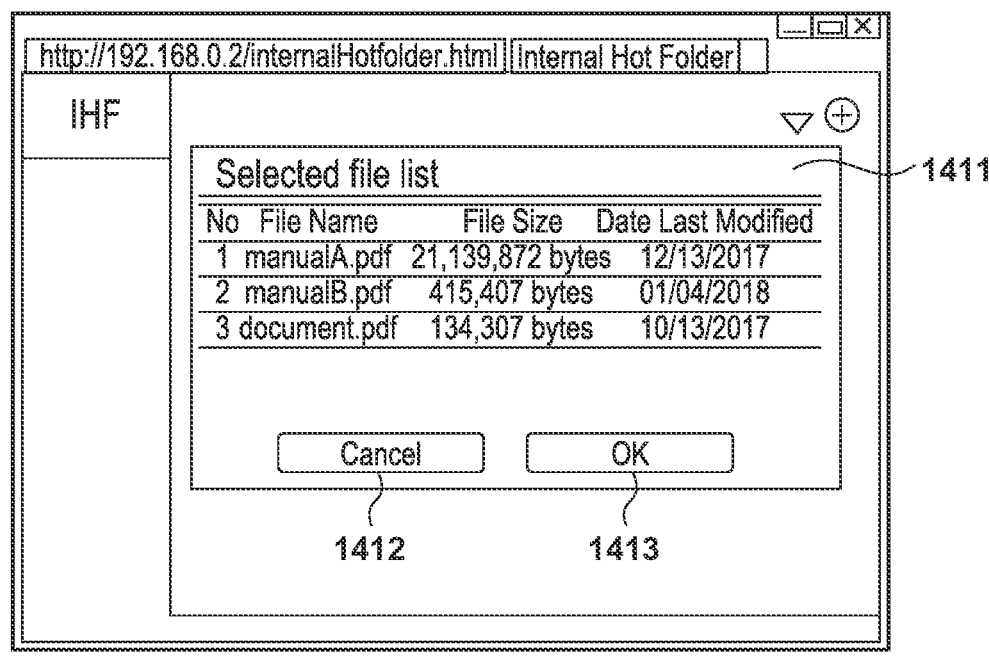
Figure 12C:
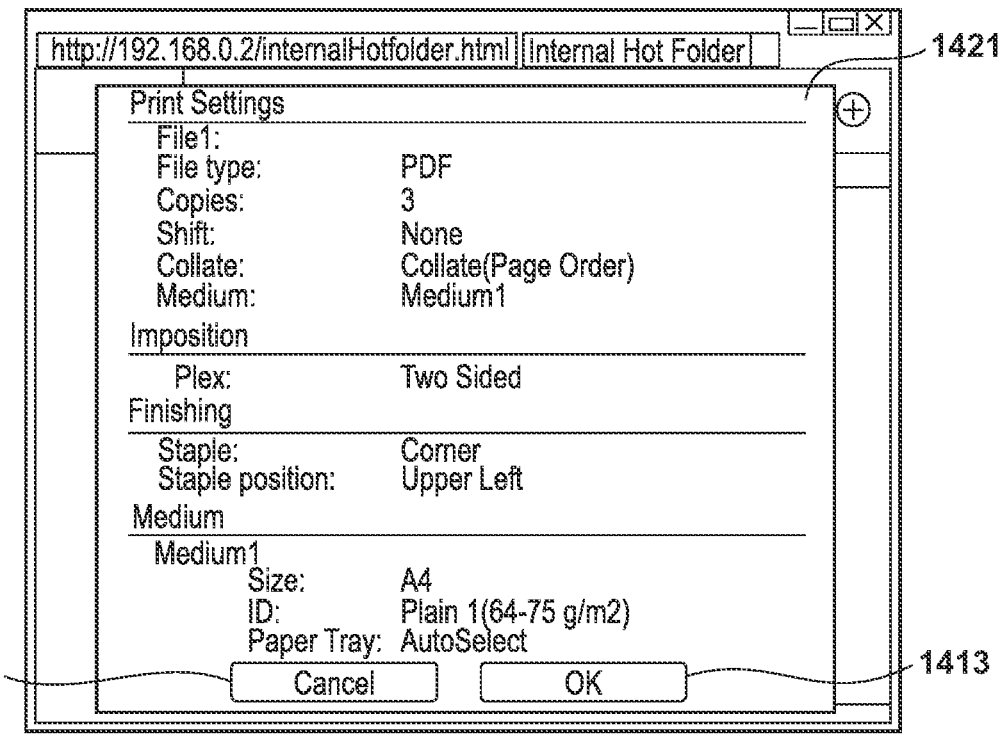
Figure 12D:
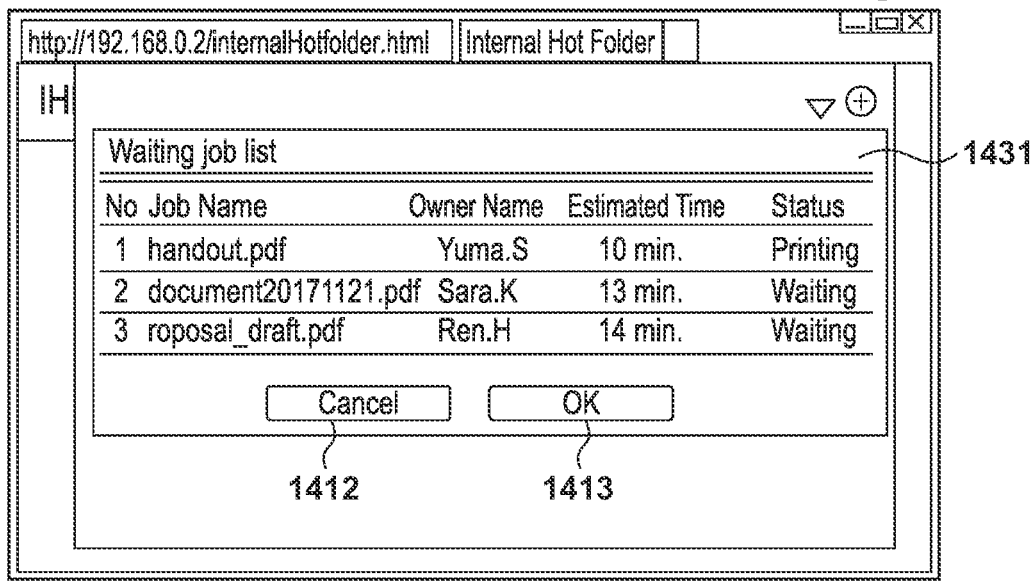

FIG. 12B, FIG. 12C, and FIG. 12D are examples of a screen (confirmation screen) displayed after the screen of FIG. 12A when a drag-and-drop operation of a file is performed as shown in FIG. 12A. In the present embodiment, the screen displayed after the screen of FIG. 12A changes in accordance with the setting (display setting of the confirmation screen) performed using the application setting screen (the confirmation screen display menu 1203).

Figure 12E:
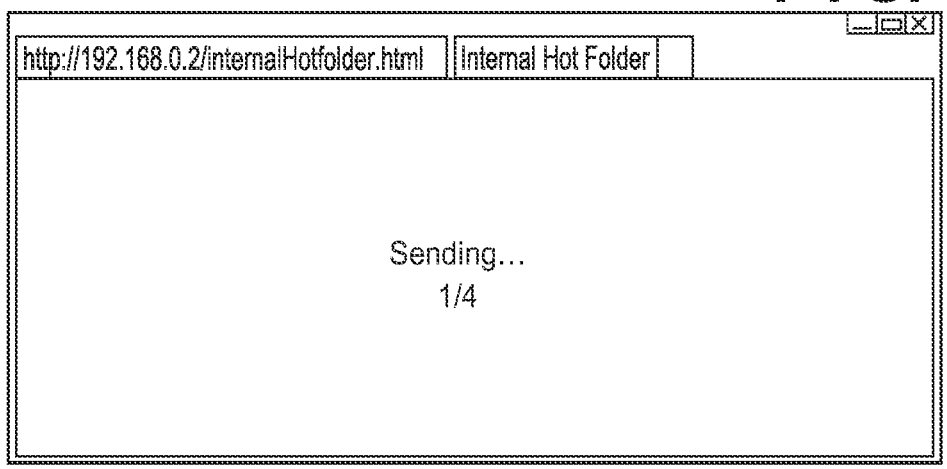

When the confirmation screen display setting is set to not display a confirmation screen, the screen transitions from the screen of FIG. 12A to the screen of FIG. 12E without displaying any of the screens of FIG. 12B, FIG. 12C, and FIG. 12D. That is, transmission of a print request and print target data (file) from the client apparatus (web browser 705) to the web server 605 is started without displaying any confirmation screen.

FIG. 12B shows an example of the confirmation screen displayed by the web browser 705 after the screen of FIG. 12A when the confirmation screen display setting is set to the display of a list of files. A transmission file list 1411 is displayed on the confirmation screen. The transmission file list 1411 is a list of files for which a print request has been made by a drag-and-drop operation. FIG. 12B shows an example in which three files of "manualA.pdf", "manualB.pdf", and "document.pdf" are simultaneously selected and a drag-and-drop operation is performed on the folder type display area 908 (i.e., a print instruction is accepted for these three files).

The files displayed in the transmission file list 1411 are printed in the displayed order. The user 326 can cancel the printing instruction (print request) by an operation described later in a case where an instruction to print a file other than an intended file was made due to an operation error or in a case where the printing will not performed in the expected print order. The confirmation screen may be configured so that in the transmission file list 1411, an operation for adding or deleting a print target file or changing the print order can be performed.

For example, it may be possible to add a file to the transmission file list 1411 by dragging and dropping the file into the transmission file list 1411. It may be possible to delete a file from the transmission file list 1411 by dragging and dropping the file in the transmission file list 1411 out of the transmission file list 1411. Further, by dropping a file in the transmission file list 1411 onto another file, the print order may be changed. Such operations may be realized by the program 1300 for displaying the confirmation screen, or may be realized by a response from the web server 605 that has received the request to obtain the file list.

A cancel button 1412 is a button for cancelling transmission of the files. When the user, having confirmed the information displayed on the confirmation screen, notices that he/she has performed an operation that he/she does not intend, the user can select the cancel button 1412 to instruct to cancel the transmission of the files. When the cancel button 1412 is selected, the transmission of the files to the web server 605 is not executed, and the screen transitions from the screen of FIG. 12B to the screen of FIG. 12G.

An OK button 1413 is a button for executing transmission of files. In a case where the user confirms that a correct print instruction has been issued based on the information displayed on the confirmation screen, the user can instruct execution of file transmission (printing) by selecting the OK button 1413. When the OK button 1413 is selected, transmission of the files to the web server 605 is started, and the screen transitions from the screen of FIG. 12B to the screen of FIG. 12E. That is, a print request to the web server 605 is executed in accordance with the final display content of the transmission file list 1411.

FIG. 12C shows an example of a confirmation screen displayed by the web browser 705 after the screen of FIG. 12A, in a case where the confirmation screen display setting is set to display print settings. A display area 1421 displays the print settings associated with the folder that is the target of the print request by the drag-and-drop operation. This display indicates that printing is to be executed by the print settings displayed in the display area 1421 when transmission of the print request and print target data (file) to the web server 605 are executed.

In a case where the user confirms the print settings displayed in the display area 1421 and notices that a print instruction has been given for a folder different from the intended folder, the user can cancel the print instruction by selecting the cancel button 1412. On the other hand, when the user confirms that a print instruction has been issued for the intended folder, the user can instruct the execution of file transmission (printing) by selecting the OK button 1413.

The confirmation screen may be configured so that the print settings displayed in the display area 1421 can be temporarily changed. For example, with respect to a setting item, such as the number of copies or the paper size, which are often changed at the time of execution of printing, the content of the change may be designated by clicking the item. Such an operation may be realized by the program 1310 for displaying the confirmation screen, or may be realized by a response from the web server 605 that has received the request to obtain the file list. In a case where the execution of file transmission is instructed by the selection of the OK button 1413, the setting values after the change by the above-described operation are transmitted to the web server 605 together with the files, whereby printing of the files is executed in the multifunctional peripheral 101 in accordance with the changed setting values.

FIG. 12D shows an example of the confirmation screen displayed by the web browser 705 after the screen of FIG. 12A when the confirmation screen display setting is set to display the jobs in the queue. In a display area 1431, a list of jobs existing in a job queue of the multifunctional peripheral 101 at the time when the print instruction by the drag-and-drop operation is performed is displayed. This display indicates that, when transmission of a print request and print target data (files) to the web server 605 has been executed, printing of the transmitted files will be executed after execution (printing) of all jobs displayed in the display area 1431 has completed.

The user can know the printing status of the multifunctional peripheral 101 by checking the information displayed in the display area 1431. Therefore, when it is found that the printing of the files to be transmitted will not be completed by an expected time, the user can cancel the print instruction by selecting the cancel button 1412. On the other hand, when it is found that the printing of the files to be transmitted will be completed by an expected time, the user can instruct the execution of transmission (printing) of the files by selecting the OK button 1413.

The confirmation screen may be configured so that it is possible to instruct to cancel or interruptedly print a job displayed in the display area 1431. For example, by selecting the job displayed in the display area 1431, a cancellation request that designates a job to be cancelled may be transmitted to the web server 605 (the multifunctional peripheral 101). When the Web server 605 receives the cancel request, the print job queue management program 611 receives user information and the cancel request from the Web server 605, and checks whether the user has the authority to cancel the designated job. The print job queue management program 611 executes cancellation of the designated job when the user has the authority, and does not execute cancellation of the job when the user does not have the authority. When cancellation is executed, the print job queue management program 611 transmits the job list after the cancellation is executed to the client apparatus as a response. Note that it is similar for a request to interrupt printing. Such an operation may be realized by the program 1320 for displaying the confirmation screen, or may be realized by a response from the web server 605 that has received a request to obtain the file list.

FIG. 12E shows an example of a screen displayed by the web browser 705 during transmission of a file. As shown in the figure, information by which it can be determined that the files are being transmitted is presented on the screen. When a plurality of files are transmitted at the same time, information indicating how many files are being transmitted is displayed, and this display is changed every time, for example, a file being transmitted is changed.

Figure 12F:
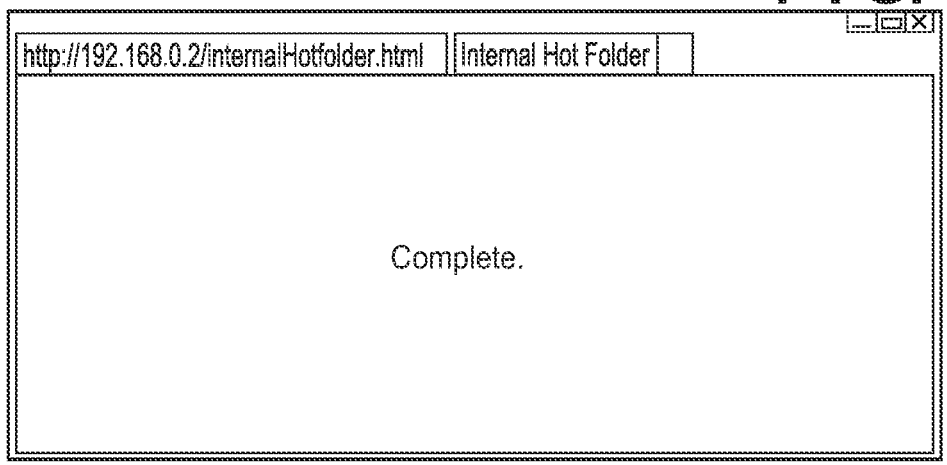

FIG. 12F illustrates an example of a screen displayed immediately after the processing (namely, the processing for transmitting the print target file) executed by the web browser 705 in FIG. 12E is completed. As shown in the figure, information by which it is possible to determine that the file transmission process completed is presented on the screen.

Figure 12G:
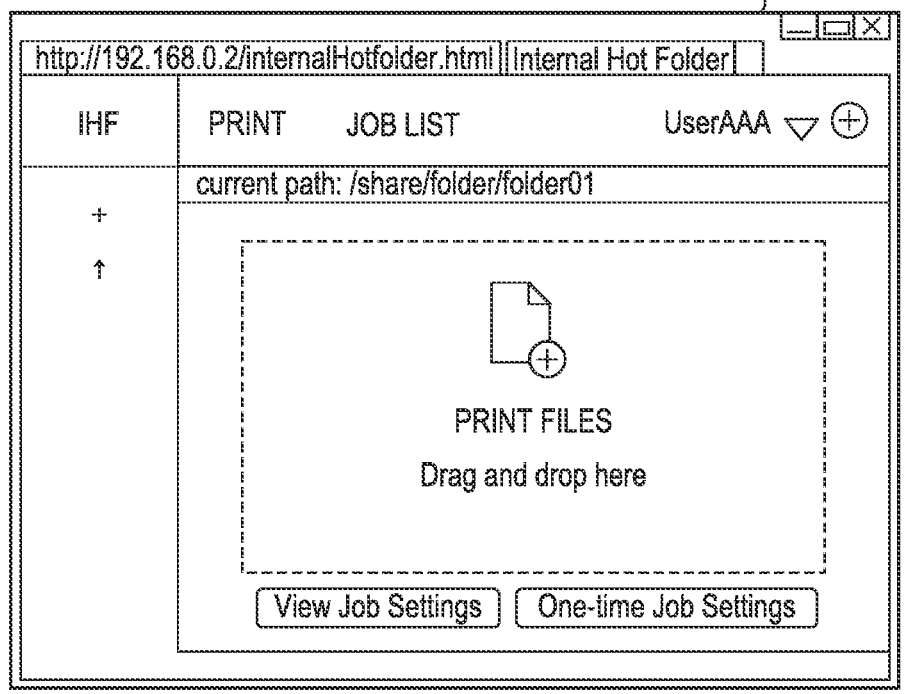

FIG. 12G shows an example of a screen transitioned to after a predetermined amount of time has elapsed after the screen displayed by the web browser 705 becomes the screen shown in FIG. 12F. The screen shown in the figure is the same as the screen shown in FIG. 7E. That is, information indicating that an instruction for print processing with respect to the current path "/share/folder/folder01" can be accepted again is presented.

Figure 12H:
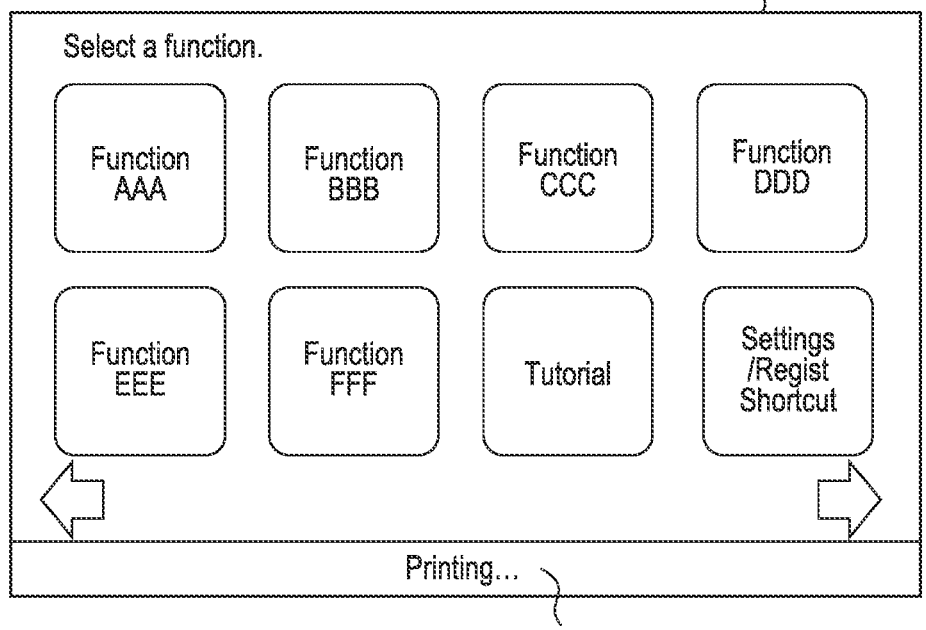

FIG. 12H illustrates an example of a screen displayed on the operation device 413 of the multifunctional peripheral 101 during execution of printing of a transmitted file. The print order of the transmitted files will be described later with reference to the flow chart of FIG. 15 and the schematic diagrams of the print lists of FIG. 18A-FIG. 18E. A status display region 1481 is an area for displaying the present state of the multifunctional peripheral 101. In the example shown in FIG. 12H, information indicating that the multifunctional peripheral 101 is executing a print process ("Printing") is displayed in the status display area 1481. When there is no state to be displayed, nothing is displayed in the status display area 1481. When an error such as a jam or an exhaustion of a consumable occurs in the multifunctional peripheral 101, the content of the error that has occurred is displayed in the status display area 1481.

<Processing Sequence when Operation Accepted on Web Browser>

Figure 13B:
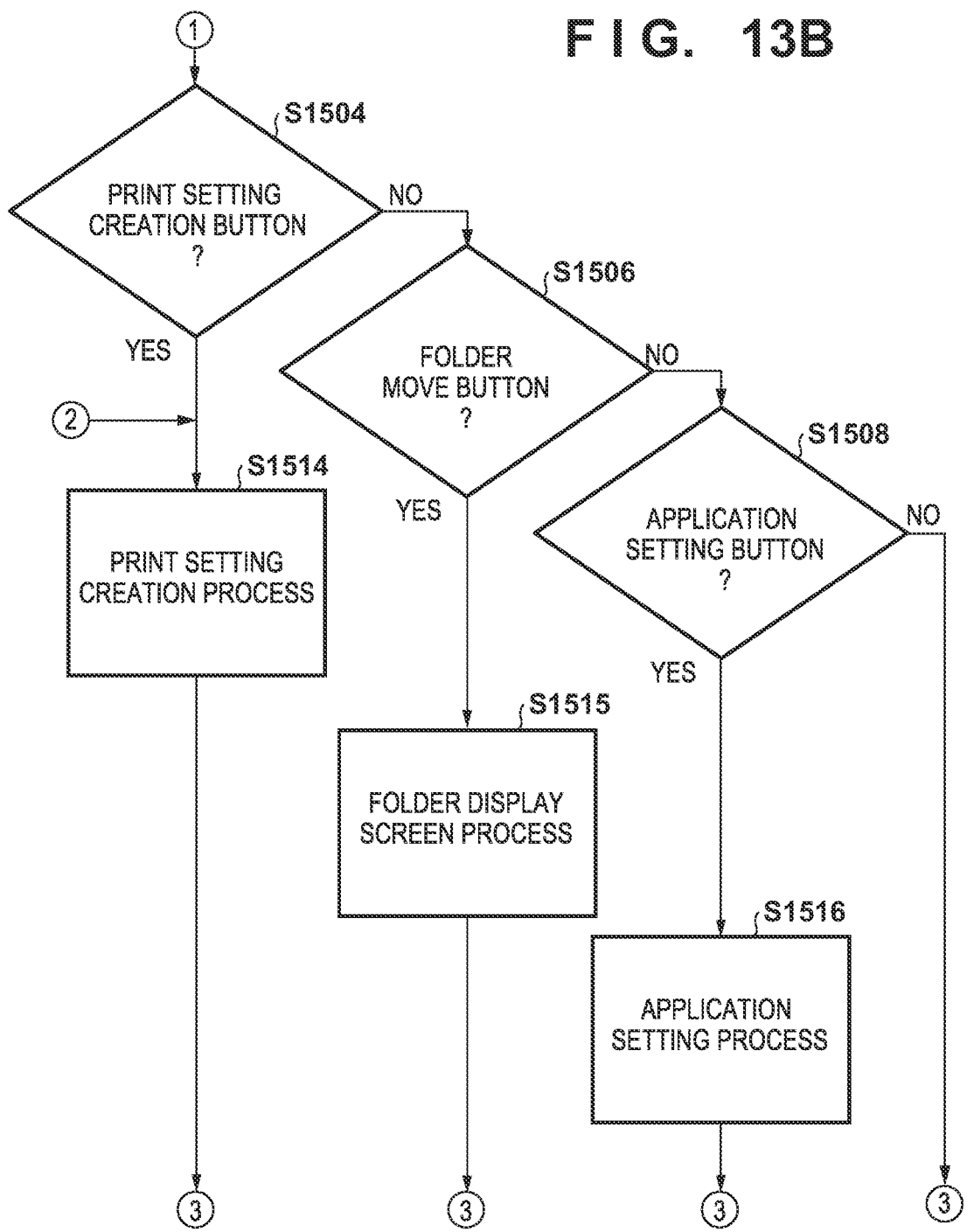

Next, referring to FIGS. 13A and 13B, a sequence of processing by the CPU 501 when executing the functions described in FIG. 7A-FIG. 12H will be described. The processing described below may be realized by, for example, the CPU 501 of the client apparatus reading out a control program stored in the ROM 503 or the HDD 511 to the RAM 502 and executing the control program. Here, the processing is started from the point where an operation screen is displayed on the web browser 705 in accordance with operation described in FIG. 6A, FIG. 6B, and FIG. 7A-FIG. 7E.

In step S1501, the CPU 501 accepts an operation from the user on the operation screen displayed as the web browser screen by the web browser 705. If it is determined that an operation has been accepted, the processing proceeds to step S1502, otherwise, the processing remains in step S1501. In step S1502, the CPU 501 determines whether or not the operation accepted in step S1501 is an operation of clicking the displayed screen. In a case of an operation where the screen is clicked, the processing proceeds to step S1504; otherwise, the processing proceeds to step S1503. The operation of clicking the screen here corresponds to a click operation by a pointing device such as mouse in the case of the PCs 102 and 103, and corresponds to a touch operation of a touch panel device in the case of the mobile terminal 104. With respect to a click operation, when a press is released within a predetermined time after the start of the press, it is determined that this operation has been performed.

In step S1503, the CPU 501 determines whether or not the operation accepted in step S1501 is an operation of dragging and dropping files onto the screen. If the operation is an operation of dragging and dropping, the processing proceeds to step S1505; otherwise, the processing returns to step S1501. With respect to a drag-and-drop operation, for example, it is determined that the operation is performed in a case of after the detection of a press of a mouse button, and, after a predetermined amount of time has elapsed and a predetermined distance has been moved, the release of the press is detected. In step S1505, the CPU 501 determines whether or not the operation in step S1501 of dragging and dropping files is an operation with respect to the folder type display area 908. If so, the processing proceeds to step S1507; otherwise, the processing returns to step S1501.

Meanwhile, in step S1504, the CPU 501 determines whether or not the operation of clicking the screen accepted in step S1501 is an operation with respect to the print setting creation button 911. With respect to a click operation, for example, when the release of a press is detected within a predetermined time after the button of the mouse is pressed, it is determined that this operation is performed. In the case of an operation where the print setting creation button 911 is clicked, the processing proceeds to step S1514; otherwise, the processing proceeds to step S1506. In step S1506, the CPU 501 determines whether the operation of clicking the screen accepted in step S1501 is an operation on a move button for moving a folder (that is, an operation on the upper hierarchical movement button 910 or the destination folder designation buttons 905 or 915). In a case of an operation where the move button is clicked, the processing proceeds to step S1515; otherwise, the processing proceeds to step S1508. In step S1508, the CPU 501 determines whether or not the operation of clicking the screen accepted in step S1501 is an operation of clicking an application setting button. If so, the processing proceeds to step S1516; otherwise, the processing returns to step S1501.

In step S1507, the CPU 501 determines whether or not a confirmation screen display program is included in a program received together with screen information when the screen information for the operating screen being displayed is received. If the confirmation screen display program is included, the processing proceeds to step S1509, and if the confirmation screen display program is not included, the processing proceeds to step S1514.

In step S1509, the CPU 501 displays the confirmation screen by executing the confirmation screen display program (e.g., any of the programs 1300, 1310, and 1320). Confirmation screen display programs and corresponding confirmation screens are described above with reference to FIG. 11A-FIG. 11C and FIG. 12A-FIG. 12H. When the confirmation screen is displayed, the processing proceeds to step S1510.

In step S1510, the CPU 501 accepts an operation from the user on the displayed confirmation screen. If it is determined that an operation has been accepted, the processing proceeds to step S1511; otherwise, the processing remains as step S1510. In step S1511, the CPU 501 determines whether or not the operation accepted in step S1510 is an operation of clicking the cancel button 1412. If the accepted operation is an operation of clicking the cancel button 1412, the display of the confirmation screen is terminated and step S1501 is returned to; otherwise, the processing proceeds to step S1512.

In step S1512, the CPU 501 determines whether or not the operation accepted in step S1510 is an operation of clicking the OK button 1413. When the accepted operation is an operation of clicking the OK button 1413, the display of the confirmation screen is terminated and the processing proceeds to step S1513, and when not, the processing returns to step S1510.

In step S1513, the CPU 501 executes transmission processing for transmitting the print target files to the web server 605. One file is transmitted in one transmission. Screen transitions associated with this transmission process are described above with reference to FIG. 12A-FIG. 12H. When the process of transmitting the print target files is completed, the processing returns to step S1501.

In step S1514, the CPU 501 displays a print setting creation screen on the web browser 705 and executes a print setting creation process for accepting input. This process is described above with reference to FIG. 8A-FIG. 8F. When this process is finished, the processing returns to step S1501.

In addition, in step S1515, the CPU 501 acquires a folder screen from the multifunctional peripheral 101, and executes a folder screen request process for displaying the acquired web page. The folder screen request process is a process for transmitting a path of a folder to be acquired by using a GET request or the like which is a standard function of a web browser, and displaying the acquired folder screen on the web browser 705. Once this screen is displayed, the processing returns to step S1501.

Also, in step S1516, the CPU 501 executes an application setting process. The application setting process is described above with reference to FIG. 10. When the application setting process ends, the processing returns to step S1501.

<Processing Sequence for when Request to Display Folder Screen is Accepted>

Figure 14:
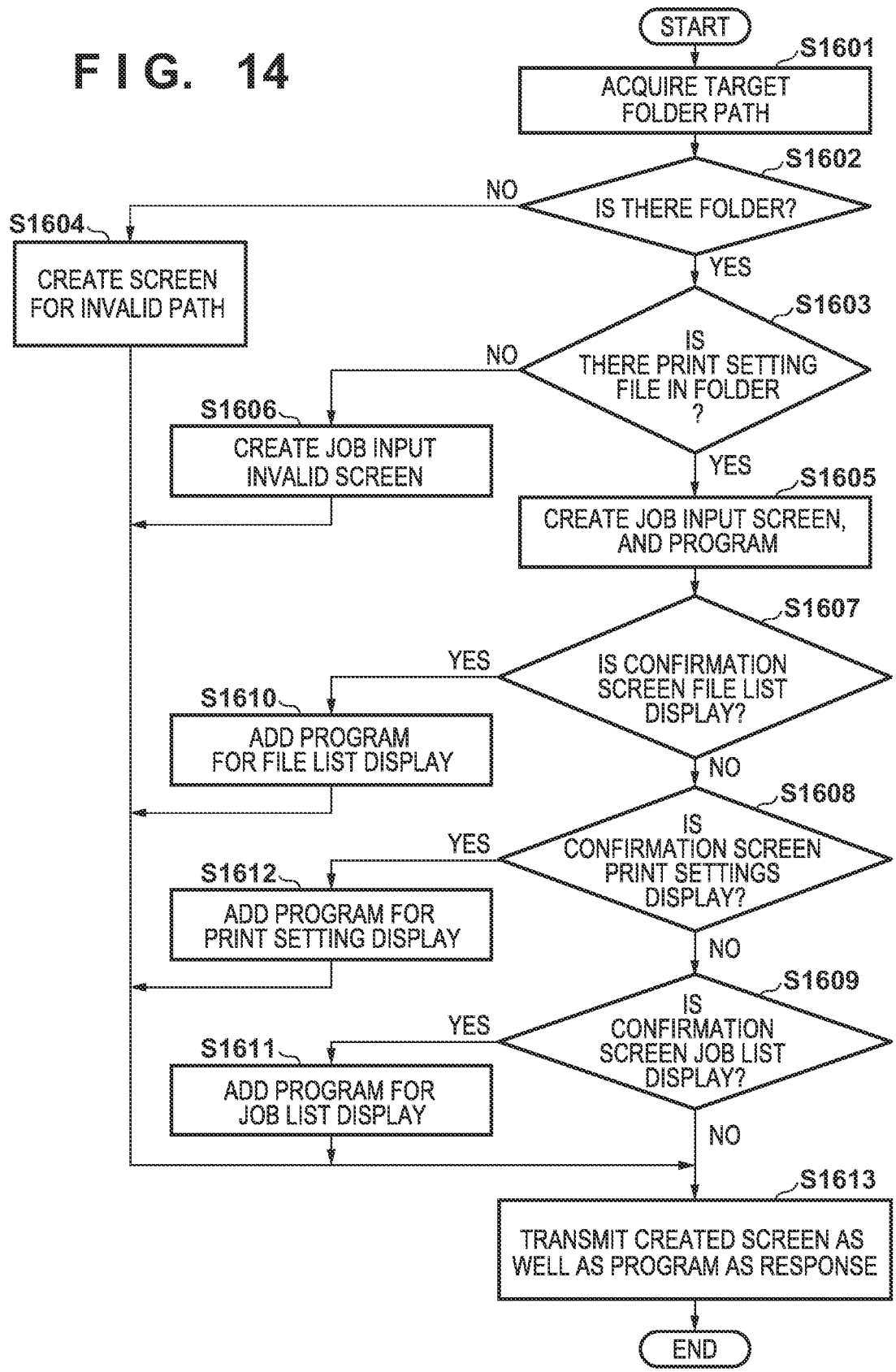
FIG. 14 is a flow chart showing a sequence of processing by a CPU 401 when a folder screen request is received.

Next, referring to FIG. 14, description is made for a sequence of processing by the CPU 401 of the multifunctional peripheral 101 when a request for displaying a folder screen according to the present embodiment is accepted. The processing described below may be realized by, for example, the CPU 401 of the multifunctional peripheral 101 reading out a control program stored in the ROM 403 or the HDD 404 to the RAM 402 and executing the control program. Processing is started when a request to display a folder screen is accepted from a client.

In step S1601, the CPU 401 acquires a path of a folder to be displayed from the accepted folder screen display request. In the present embodiment, it is assumed that a folder screen display request is made by the HTML communication GET method, and the path of the folder is designated by a GET parameter. When the path of the folder is acquired, the processing proceeds to step S1602.

In step S1602, the CPU 401 determines whether or not a folder exists at the folder path acquired in step S1601. If a folder exists, the processing proceeds to step S1603, and if a folder does not exist, the processing proceeds to step S1604. In step S1604, the CPU 401 creates the web page shown in FIG. 8E, which is a folder screen indicating that the folder path is invalid, and the processing proceeds to step S1613.

Meanwhile, in step S1603, the CPU 401 determines whether or not there is a print setting file in the folder indicated by the folder path acquired in step S1601. Whether or not there is a print setting file is determined by acquiring a list of files in the folder and determining whether or not there is a file having a predetermined file extension. If a print setting file is present, the processing proceeds to step S1605, otherwise the processing proceeds to step S1606. It is assumed that, if the folder itself is not present, there is no print setting file. In step S1606, the CPU 401 creates the web page of FIG. 7D, which is a folder screen in which the designated print request is invalid, and the processing proceeds to step S1613.

In step S1605, the CPU 401 creates the web page of FIG. 8D, which is a designated folder screen with respect to which a print request is possible, and a program that operates on a web browser 705, and the processing proceeds to step S1607. Here, it is assumed that a part of the print request process is performed by JavaScript.

In step S1607, the CPU 401 determines whether or not a setting (display setting of the confirmation screen) made using the application setting screen 1200 (confirmation screen display menu 1203) is the setting for displaying a list of files. The confirmation screen display setting is described above with reference to FIG. 10. If the confirmation screen display setting is the setting for displaying a list of files, the processing proceeds to step S1610, otherwise, the processing proceeds to step S1608. In step S1610, the CPU 401 selects a confirmation screen display program (program 1300) for displaying a file list from pre-created programs and adds it to the program created in step S1605. As described above, in the present embodiment, the program 1300 may be configured by JavaScript. Thereafter, the processing proceeds to step S1613.

In step S1608, the CPU 401 determines whether or not the confirmation screen display setting is the setting for displaying print settings. If the confirmation screen display setting is the setting for displaying print settings, the processing proceeds to step S1612, and if not, the processing proceeds to step S1609. In step S1612, the CPU 401 selects the confirmation screen display program (program 1310) for displaying the print settings from programs that have been created in advance and adds it to the program that has been created in step S1605. Thereafter, the processing proceeds to step S1613.

In step S1609, the CPU 401 determines whether or not the confirmation screen display setting is a setting for displaying jobs in the queue. If the confirmation screen display setting is a setting for displaying jobs in the queue, the processing proceeds to step S1611, otherwise, the processing proceeds to step S1613. In step S1611, the CPU 401 selects a confirmation screen display program (program 1320) for displaying a list of jobs in the queue from a pre-created program and appends it to the program created in step S1605. Thereafter, the processing proceeds to step S1613.

In step S1613, the CPU 401 transmits, as a response (reply), a web page, a file transmission program, a confirmation screen display program, or the like created in step S1604, step S1606, step S1605, step S1610, step S1611, or step S1612, and ends the process.

<Print Request Reception Processing>

Figure 15:
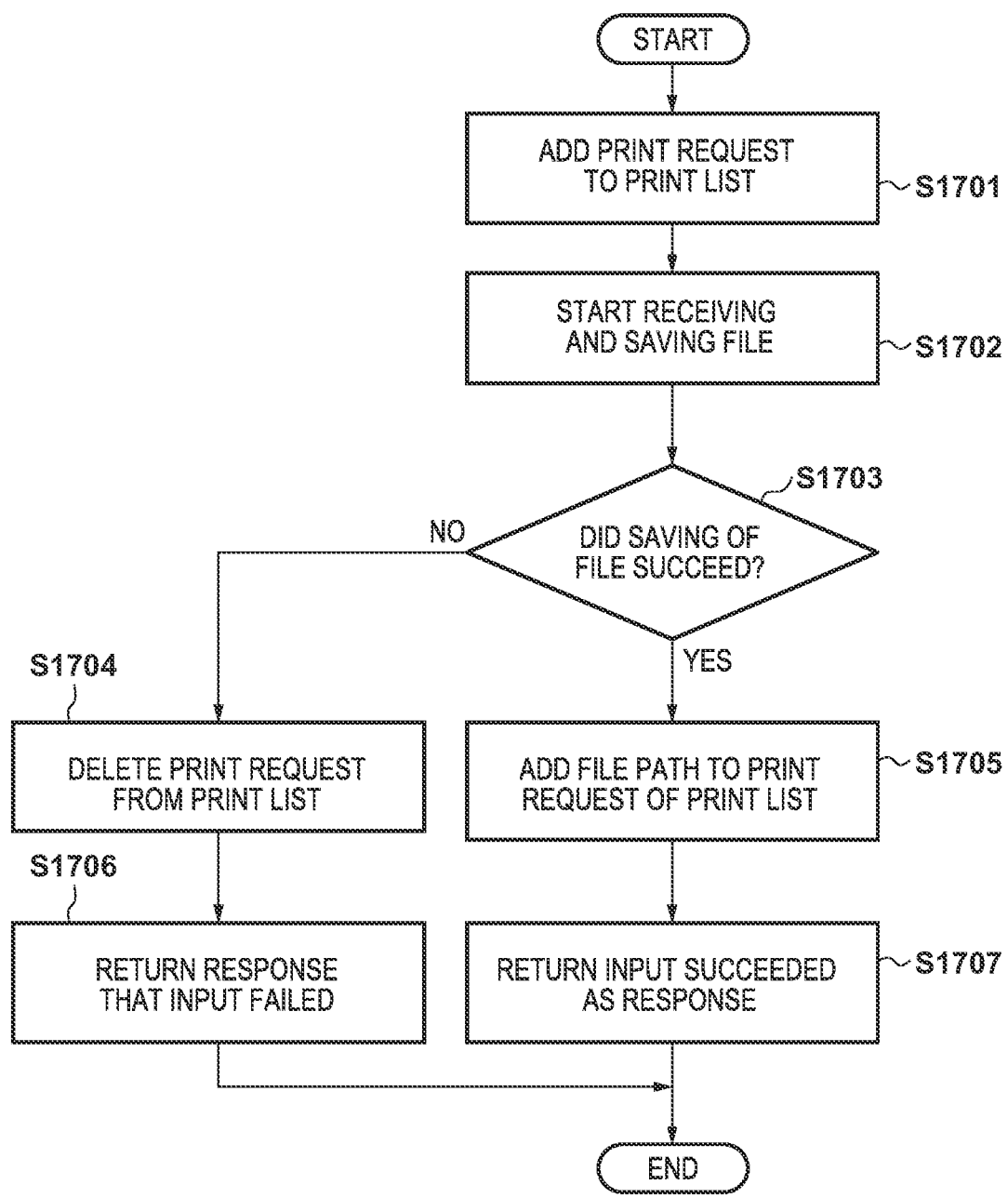
FIG. 15 is a flow chart showing a sequence of processing by a CPU 401 when a print request is accepted.

Next, referring to FIG. 15, description is given for a sequence of processing by the CPU 401 of the multifunctional peripheral 101 when a print request transmitted by the client apparatus 102, 103, or 104 is received in step S1513 described above. The processing described below may be realized by, for example, the CPU 401 of the multifunctional peripheral 101 reading out a control program stored in the ROM 403 or the HDD 404 to the RAM 402 and executing the control program. When a print request from the client apparatus 102, 103, or 104 is detected, the processing is started.

In step S1701, the CPU 401 adds the print request to the end of a print list stored in the RAM 402 and the processing proceeds to step S1702. The information to be added includes the path of a hot folder that is the input destination and is included in the received request, the name of the person who inputted the request, a file name, and the like. In step S1702, the CPU 401 reads a body portion of the request and saves a file in a storage unit such as the HDD 404. Once the file is saved, the processing proceeds to step S1703.

In step S1703, the CPU 401 determines whether or not the saving of the file succeeded. It fails in a case where the network is disconnected while a file is being received, a case where the storage area of the HDD 404 is insufficient and saving cannot be performed, and the like. If the file is successfully saved, the processing proceeds to step S1705; otherwise, the processing proceeds to step S1704.

In step S1704, the CPU 401 deletes the print request added in step S1701 from the print list. Subsequently, in step S1706, the CPU 401 creates and returns a response indicating that input of the file has failed. The response may include, for example, a web page for displaying a screen indicating that the file input has failed. When the response is returned, the network is disconnected, and the processing ends. Note that, if the network has been disconnected, the processing ends without the return of a response.

Meanwhile, in step S1705, the CPU 401 adds the file path (save destination) to which the file was saved in step S1702 to the print request added in step S1701. Subsequently, in step S1707, the CPU 401 creates and returns a response indicating that input of the file has succeeded. The response may include a web page or the like for displaying a screen indicating that the file has been successfully input. When the response is returned, the network is disconnected and the processing ends. Note that, if the network has been disconnected, the processing ends without the return of a response.

<Sequence of Processing for Case of Processing Print Requests of Print List>

Next, referring to FIG. 16, a sequence of processing for sequentially printing print requests of a print list stored in the RAM 402 will be described. The processing described below may be realized by, for example, the CPU 401 of the multifunctional peripheral 101 reading out a control program stored in the ROM 403 or the HDD 404 to the RAM 402 and executing the control program. The CPU 401 performs the processing of the print request shown in FIG. 16 in parallel with the processing for the time of receiving the print request shown in FIG. 15. When it is detected that the print list stored in the RAM 402 is changed, the processing is started.

In step S1801, the CPU 401 determines whether or not the path of a file is stored in the first print request of the print list. If not even one print request is stored in the print list or the path of a file is not stored in the first print request, the processing is terminated.

In step S1802, the CPU 401 retrieves the print request for which print processing has been performed, that is, the first print request, from the print list, and deletes this print request from the print list. After deletion, the processing proceeds to step S1803. Subsequently, in step S1803, the CPU 401 performs print processing of the print request retrieved in step S1802. This processing will be described later with reference to FIG. 17. When the print processing of the print request has been performed, the processing proceeds to step S1801.

<Sequence of Processing for Print Processing of Print Request>

Next, referring to FIG. 17, a sequence of processing by the CPU 401 in the processing of the print request of step S1803 of the present embodiment will be described. The processing described below may be realized by, for example, the CPU 401 of the multifunctional peripheral 101 reading out a control program stored in the ROM 403 or the HDD 404 to the RAM 402 and executing the control program. This processing starts when, in step S1801 described above, the CPU 401 determines that the path of the file in the first print request of the print list has been stored.

In step S1901, the CPU 401 determines whether or not there is a print setting file in the destination folder which is stored in the first print request of the print list. Here, it is assumed that the print setting file is a JDF file, and it is determined whether or not a file is a JDF file in accordance with the file extension. If there is a JDF file, the processing proceeds to step S1902; if there is no JDF file, the processing proceeds to step S1907. When the folder itself is not present, it is determined that there is no JDF file.

In step S1902, the CPU 401 analyzes the JDF file. In this processing, syntax analysis and semantic analysis of the JDF file are performed, and values necessary for print settings are acquired. The print settings acquired here are the print settings designated by the creation screens described by FIG. 8A-FIG. 8F. Subsequently, in step S1903, the CPU 401 determines whether there is an error in a result of the analysis of the JDF file in step S1902. An error occurs in a case where syntax is incorrect, a case where a print setting includes a designation for which execution is impossible, and the like. When an error is detected, the processing proceeds to step S1907, and when there is no error, the processing proceeds to step S1904.

In step S1904, the CPU 401 acquires the file path stored in the first print request of the print list, and prints the file. The print settings acquired in the JDF analysis processing of step S1902 are used to print the file. Next, in step S1905, the CPU 401 determines whether or not printing of the file which was performed in step S1904 succeeded. Printing fails in a case where a print file does not exist, a case where printing is canceled part way through, or the like. If it is determined that printing succeeded, the processing proceeds to step S1906; otherwise, the processing proceeds to step S1907.

In step S1906, the CPU 401 stores the print request as printing complete at the end of the print history stored in the RAM 402, and ends the processing. Meanwhile, in step S1907, the CPU 401 stores, at the end of the print history stored in the RAM 402, that printing failed for the print request, and ends the processing.

<Change of Print List>

Figure 16:
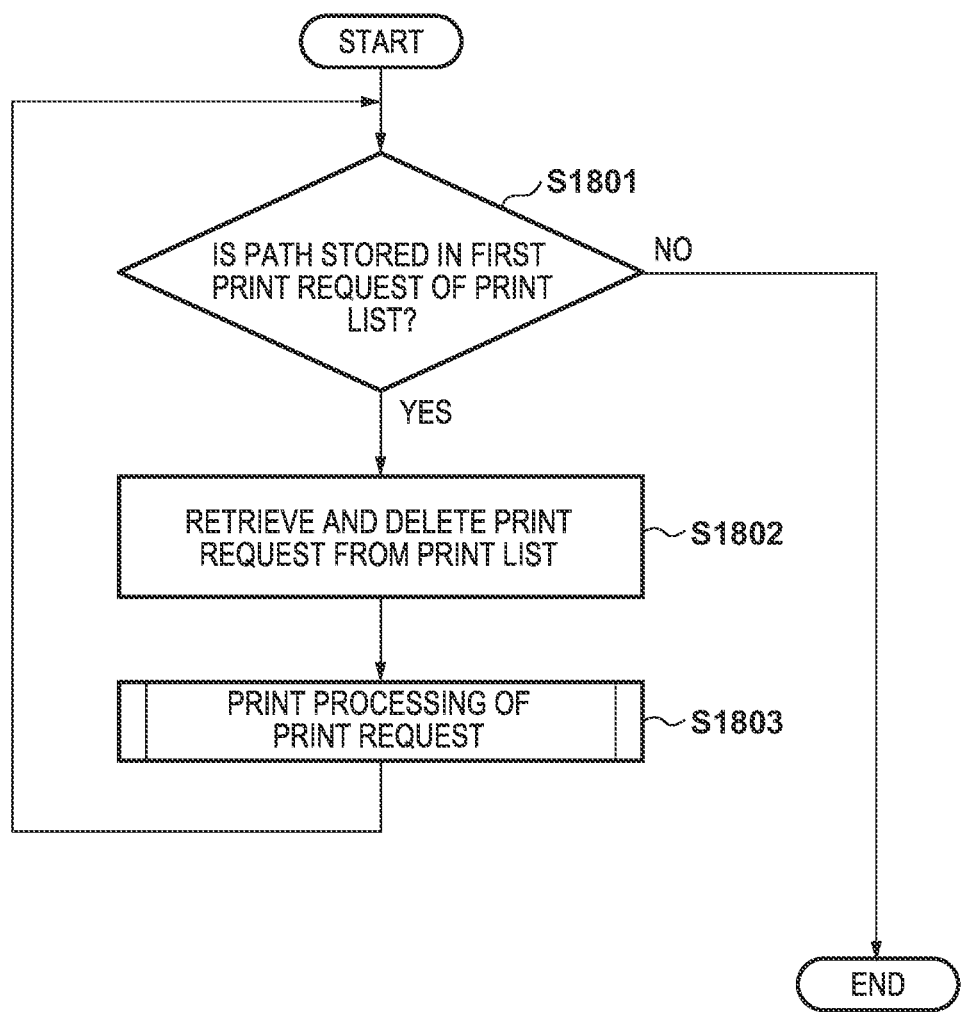
FIG. 16 is a flow chart showing a sequence of processing by the CPU 401 for controlling a print order of accepted files.

Next, referring to FIG. 18A-FIG. 18E, description is given for reception of a print request that described using FIG. 15 and FIG. 16, and how the print list stored in the RAM 402 changes in print request processing.

FIG. 18A shows a print list when the print request of "document.pdf" received in the folder02 folder 1124 is added to the end of the print list in step S1701. In correspondence with the ID "102" assigned to identify the request, a destination folder path, the name of the person who inputted the request (user name), and the file name obtained from the print request are registered. However, the file path is not registered because saving of the file has not completed. The file path is additionally registered in step S1705 that reception of the accepted file "marketing_materials.pdf" has completed.

FIG. 18B shows the print list for when processing of the print request for "marketing_materials.pdf" is started. In step S1802, the print request with the ID "101" is deleted. Since the reception of the file of "document.pdf" has not been completed even at this time point, the file path is not registered in the print request of the ID "102". The process of print request for the print list in FIG. 16 ends from step S1801.

FIG. 18C shows the print list when the print request of "handout.pdf" received in the folder01 folder 1123 is added to the end of the print list in step S1701. Since the reception of the file of "document.pdf" has not been completed even at this time point and the file path has not been registered, the process for the print request for the print list of FIG. 18A-FIG. 18E finishes from step S1801.

FIG. 18D shows a print list when the saving of "handout.pdf" is completed and the file path is additionally registered in the print request of the ID "103" in step S1705. Since the reception of the file of "document.pdf" has not been completed even at this time point and the file path has not been registered, the process for the print request for the print list of FIG. 18A-FIG. 18E finishes from step S1801.

FIG. 18E shows a print list when the saving of "document.pdf" is completed and the file path is additionally registered in the print request of the ID "102" in step S1705. In step S1803, the print process of the print request at the head of the print list is executed.

As described above, the multifunctional peripheral 101 (the image forming apparatus) according to the present embodiment transmits, to a client apparatus, screen information of an operation screen displayable by a web browser. More specifically, the multifunctional peripheral 101 transmits screen information of a first operation screen for accepting from a user an operation of storing a print target file in a folder (hot folder) that is accessible from the client apparatus and to which a print setting is associated. Further, the multifunctional peripheral 101 transmits screen information of a second operation screen (confirmation screen) for, in a case where the multifunctional peripheral 101 accepts a file storage operation from the user through the first operation screen, accepting the determination as to whether or not to transmit a print target file to the multifunctional peripheral 101 from the user. If a file transmitted from the client apparatus is stored in the hot folder, the multifunctional peripheral 101 performs a process of printing the file in accordance with the print setting.

The client apparatus according to the present embodiment displays an operation screen as a web browser screen on the UI unit 301 based on the screen information received from the multifunctional peripheral 101. In a case where the client apparatus accepts an operation for storing the print target file in the hot folder from the user during the display of the first operation screen, the client apparatus displays the second operation screen (confirmation screen). In a case where the client apparatus has accepted a determination to not transmit a print target file via the second operation screen, the client apparatus does not transmit a print target file to the multifunctional peripheral 101. On the other hand, in a case where the client apparatus has accepted a determination to transmit a print target file, the client apparatus transmits the print target file to the multifunctional peripheral 101, thereby causing the multifunctional peripheral 101 to execute the print processing.

As described above, according to the present embodiment, in a case where a print instruction is accepted by a file storage operation via an operation screen provided from the multifunctional peripheral 101 to a client apparatus, it is possible to prompt a user to confirm execution of printing by displaying a confirmation screen. Thus, it is possible to prevent unintended printing from being performed due to a user's operation error.

In addition, according to the above-described embodiment, by displaying on the confirmation screen a list of print target files for which a print instruction has been accepted, the user can confirm which file is transmitted to the multifunctional peripheral 101. As a result, it is possible to prevent unintended printing from being performed due to a user's operation error.

Further, according to the above-described embodiment, by displaying print settings used for printing a print target file associated with a hot folder on a confirmation screen, the user can confirm the print settings before the print target file is transmitted to the multifunctional peripheral 101. As a result, it is possible to prevent the print processing from being performed with print settings that are different from what the user wants.

In addition, according to the above-described embodiment, by displaying a list of print jobs present in a queue of the multifunctional peripheral 101 on the confirmation screen, the user can predict a time over which the user will have to wait until completion of the print processing on the print target file to be transmitted. As a result, it is possible to prevent a large waiting time from occurring.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145410, filed Aug. 1, 2018, which is hereby incorporated by reference herein in its entirety.

What is claimed is:

1. An image forming apparatus capable of communicating with an information processing apparatus, the image forming apparatus comprising:
   a processing unit configured to, in a case where a file transmitted from the information processing apparatus is stored in a folder that is accessible from the information processing apparatus and with which a print setting is associated, perform processing for printing the file in accordance with the print setting; and
   a transmission unit configured to transmit, to the information processing apparatus, screen information of an operation screen displayable by a web browser, the transmission unit transmitting screen information of a first operation screen for accepting an operation for storing a print target file in the folder from a user, and screen information of a second operation screen for, in a case where the operation is accepted from the user via the first operation screen, accepting a determination as to whether or not to transmit the print target file to the image forming apparatus from the user.

2. The image forming apparatus according to claim 1, wherein
   the second operation screen includes a display of a list of print target files for which a print instruction has been accepted via the first operation screen.

3. The image forming apparatus according to claim 2, wherein
   the transmission unit further transmits, to the information processing apparatus, screen information of a setting screen for setting display content in the second operation screen, and
   the image forming apparatus further comprises a generation unit configured to, in accordance with a setting performed via the setting screen, generate screen information, to be transmitted to the information processing apparatus, of the second operation screen which includes set display content.

4. The image forming apparatus according to claim 1, wherein
   the second operation screen includes a display of the print setting associated with the folder and used for printing a print target file.

5. The image forming apparatus according to claim 1, wherein
   the second operation screen includes a display of a list of print jobs existing in a queue of the image forming apparatus.

6. The image forming apparatus according to claim 1, wherein
   the transmission unit generates a display program that operates on the web browser and is for displaying the second operation screen, and transmits, to the information processing apparatus, the display program together with screen information of the first operation screen.

7. The image forming apparatus according to claim 1, wherein
   the first operation screen includes a display area for accepting an operation for storing a print target file in the folder, and the operation for storing the print target file in the folder is a drag-and-drop operation onto the display area.

8. The image forming apparatus according to claim 1, wherein the first operation screen is further configured to enable operations for creating a folder and moving a folder hierarchy.

9. A method for controlling an image forming apparatus capable of communicating with an information processing apparatus, the method comprising:

in a case where a file transmitted from the information processing apparatus is stored in a folder that is accessible from the information processing apparatus and with which a print setting is associated, performing processing for printing the file in accordance with the print setting; and transmitting, to the information processing apparatus, screen information of an operation screen displayable by a web browser, wherein screen information of a first operation screen for accepting an operation for storing a print target file in the folder from a user, and screen information of a second operation screen for, in a case where the operation is accepted from the user via the first operation screen, accepting a determination as to whether or not to transmit the print target file to the image forming apparatus from the user, are transmitted.

10. A non-transitory computer-readable storage medium storing a computer program for causing a computer to execute a method for controlling an image forming apparatus capable of communicating with an information processing apparatus, the method comprising:

in a case where a file transmitted from the information processing apparatus is stored in a folder that is accessible from the information processing apparatus and with which a print setting is associated, performing processing for printing the file in accordance with the print setting; and transmitting, to the information processing apparatus, screen information of an operation screen displayable by a web browser, wherein screen information of a first operation screen for accepting an operation for storing a print target file in the folder from a user, and screen information of a second operation screen for, in a case where the operation is accepted from the user via the first operation screen, accepting a determination as to whether or not to transmit the print target file to the image forming apparatus from the user, are transmitted.

11. A system including an image forming apparatus and an information processing apparatus capable of communicating with the image forming apparatus, wherein the image forming apparatus comprises:

a processing unit configured to, in a case where a file transmitted from the information processing apparatus is stored in a folder that is accessible from the information processing apparatus and with which a print setting is associated, perform processing for printing the file in accordance with the print setting; and a first transmission unit configured to transmit, to the information processing apparatus, screen information of an operation screen displayable by a web browser, the first transmission unit being configured to transmit screen information of a first operation screen for accepting an operation for storing a print target file in the folder from a user, and screen information of a second operation screen for accepting a determination as to whether or not to transmit the print target file to the image forming apparatus from a user, and the information processing apparatus comprises:

a display control unit configured to display, on a display unit, an operation screen as a web browser screen based on screen information received from the image forming apparatus, the display control unit displaying the second operation screen when an operation for storing a print target file in the folder is accepted from a user during display of the first operation screen; and a second transmission unit configured to, in a case where a determination to not transmit the print target file is accepted via the second operation screen, not transmit the print target file to the image forming apparatus, and in a case where a determination to transmit the print target file is accepted, transmit the print target file to the image forming apparatus.

* * * * *